US009073798B1

(12) United States Patent  (10) Patent No.: US 9,073,798 B1
Brooke  (45) Date of Patent: *Jul. 7, 2015

(54) PLANT FERTILIZER COMPOSITIONS AND RELATED METHODS

(75) Inventor: Lawrence L. Brooke, Sebastopol, CA (US)

(73) Assignee: General Hydroponics, Inc., Sebastopol, CA (US)

(*) Notice: Subject to any disclaimer, the term of this patent is extended or adjusted under 35 U.S.C. 154(b) by 308 days.

This patent is subject to a terminal disclaimer.

(21) Appl. No.: 13/188,449

(22) Filed: Jul. 21, 2011

Related U.S. Application Data

(60) Provisional application No. 61/366,712, filed on Jul. 22, 2010.

(51) Int. Cl.
*C05G 1/00* (2006.01)
*C05D 9/02* (2006.01)

(52) U.S. Cl.
CPC .......................................... *C05D 9/02* (2013.01)

(58) Field of Classification Search
CPC ................................... C05F 1/00; C05D 9/02
USPC ............................................ 71/11–63, 64.1
See application file for complete search history.

(56) References Cited

U.S. PATENT DOCUMENTS

| 1,513,542 A | 10/1924 | Flagg |
| 2,452,385 A | 10/1948 | Merckel |
| 4,126,417 A | 11/1978 | Edwards |
| 5,851,260 A * | 12/1998 | Aijala et al. ....................... 71/28 |
| 8,197,572 B2 * | 6/2012 | Wells ................................ 71/11 |
| 8,425,647 B1 * | 4/2013 | Brooke .............................. 71/11 |
| 2010/0186471 A1* | 7/2010 | Vriesema et al. .................. 71/28 |
| 2011/0214465 A1* | 9/2011 | Peacock et al. .................... 71/28 |

FOREIGN PATENT DOCUMENTS

| JP | 2003112990 | 4/2003 |
| KR | 100601721 | 7/2006 |

\* cited by examiner

*Primary Examiner* — Wayne Langel
(74) *Attorney, Agent, or Firm* — Brooks Acordia IP Law, PC; Pejman Yedidsion

(57) ABSTRACT

The present invention relates to plant fertilizer compositions and methods that may be used over the growth and blooming or fruiting stage of plant life. In some aspects, the present invention relates to blending plant fertilizer constituents and more particularly, the present invention relates to tailoring the ratio of nutrients in a fertilizer composition by colorizing fertilizer constituents according to their nutrient content and mixing the colorized fertilizers until the resultant color matches a reference color associated with a desired fertilizer composition. In other aspects, the present invention relates to plant fertilizers that avoid the unavailability of calcium due to precipitation, and in additional aspects, dual-component plant fertilizers and related kits and methods are provided that permit admixing of only two fertilizer concentrates while avoiding deleterious precipitation of reactive moieties.

20 Claims, 4 Drawing Sheets

| DAY | FERTILITY COLOR REFERENCE HUE | CONCENTRATION |
|---|---|---|
| 1 | BLUE + YELLOW → GREEN | 800 ppm<br><br>e.g., 1.6 mS/cm |
| 10 | BLUE + YELLOW → BLUE GREEN | 780 ppm<br><br>e.g., 1.56 mS/cm |
| 19 | BLUE | 710 ppm<br><br>e.g., 1.42 mS/cm |
| 28 | RED + BLUE → PURPLE | 610 ppm<br><br>e.g., 1.22 mS/cm |
| 35 | RED | 605 ppm<br><br>e.g., 1.21 mS/cm |

Fig. 1

PLANT FERTILIZER COMPOSITIONS AND RELATED METHODS

CROSS-REFERENCE TO RELATED CASE

This application claims priority to and benefit of U.S. Provisional Patent Application No. 61/366,712, filed Jul. 22, 2010, which is hereby incorporated herein by reference in its entirety for all purposes.

FIELD OF THE INVENTION

The present invention broadly relates to plant fertilizer compositions, methods, kits and related materials and methods, and, in particular aspects, to liquid plant fertilizer compositions, methods, related kits and the like.

BACKGROUND

Plants are harvested for a variety of useful products. Although some plants are coveted for their leaf such as spinach and lettuce, the stalk such as asparagus, and the root such as carrots, many plants are useful for some aspect of their reproductive cycle, such as the flowering portion (roses), the fruit such as avocado, and the seed such as corn and wheat.

In addition to water and carbon dioxide that plants require to grow, plants also require minerals to grow in a healthy manner, and to provide us with those nutrients that are essential to our own health. These minerals are normally absorbed through the roots, though in some cases foliar application is effective.

Although the specific needs and relative proportions of nutrients needed by different species of plants may vary, as a general rule, all plants require the same nutrients. The necessary proportions, however, vary from specie to specie, as well as throughout the life cycle of a plant. Environmental ranges of light, temperature, humidity, airflow, etc. can also have a controlling effect on ideal nutrient composition for various crops in their range. Optimizing nutrient delivery throughout the plant lifecycle may optimize the growth or development of those aspects of a plant found most desired.

SUMMARY

The present invention provides compositions and methods for plant fertilizers, and, in particular aspects, liquid plant fertilizers. In various aspects, the present compositions and methods optimize delivery of nutrients to a plant. Particular embodiments include plant fertilizer systems for optimum plant nutrient delivery.

Embodiments include (I) mixable plant fertilizer components based on color, (II) dual-component plant fertilizers capable of providing a finely tuned range of nutrient blends while delivering complete plant nutrients appropriate for plant growth or bloom stage, (III) dual-component mixable plant fertilizers based on color, and related compositions, including kits, and methods.

BRIEF DESCRIPTION OF THE DRAWINGS

Embodiments of the present invention are illustrated by way of example and not limitation in the figures of the accompanying drawings, and in which:

FIG. 1 is a sample look-up table for use in conjunction with the claimed invention;

DETAILED DESCRIPTION

Figure 2:
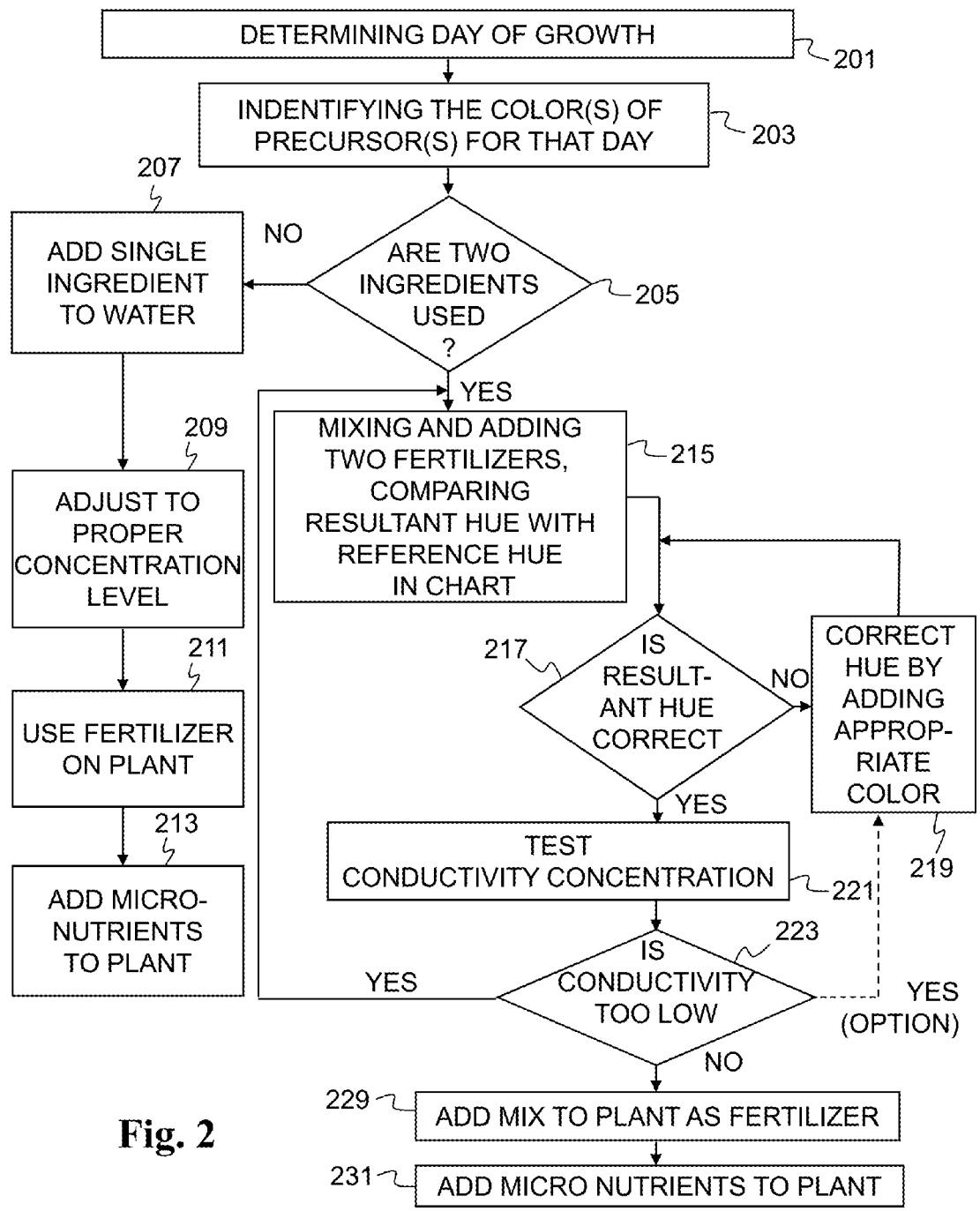
FIG. 2 is a flow chart of a process of mixing fertilizer according to the claimed invention.

Broadly, the present invention relates to compositions and methods for optimizing the delivery of complete nutrients to a plant over the course of growth, bloom and fruiting stages of plant life, as desired. Whereas sufficient (yet not optimized) nutrient delivery may yield acceptable plant material, optimizing plant nutrient delivery may maximize plant material yield, quality or other desired aspect. The present invention provides, among other things, plant fertilizer systems that may be mixed throughout a range to provide optimum plant nutrients.

In general, nutrients for which delivery may be optimized may be categorized into "primary" and "secondary" and "trace." The "primary nutrients" include nitrogen, phosphorus, and potassium, commonly referred by the triplet "NPK." These are called primary because they are usually needed in the greatest proportion relative to other nutrients. "Secondary nutrients" include calcium, magnesium, and sulfur, usually in the form of sulfate. Trace element needs include iron, manganese, zinc, copper, boron, chloride, and molybdenum. Though the studies are in their formative stages, more recent evidence shows that cobalt, silicon, nickel and chloride are also needed, or helpful to plant growth, in trace amounts. The secondary nutrients are typically required in lesser quantities than the primary nutrients, but higher quantities than the trace elements. There is, however, some overlap. For example, calcium, listed above as a secondary nutrient, is often needed in higher quantities than phosphorus.

The required levels for some nutrients may remain fairly stable over the life cycle of the plant. For other nutrients, however, the requirement levels vary significantly throughout the life cycle. Accordingly, the production of a healthy leaf at the beginning of a life cycle may have significantly different nutritional needs than the production of flower, fruit, or seed near the end of the life cycle.

Most plants are satisfied by a balance of nutrients at levels that remain fairly stable over the life of the plant. A few nutritional requirements, however, such as nitrogen, phosphate and magnesium often have a wide range of variation over the life of a plant for optimum growth, vigor, and yield. Young plants require high levels of nitrogen to enable their early structural growth of roots, stems, and foliage. At a later stage in a plants growth, such as the flowering, fruiting or seed production stages, the need for nitrogen decreases significantly. Simultaneously, the need for other nutrients may increase throughout the life of a plant. For example, phosphate and magnesium are important for flowering, and the required levels frequently increase during this stage of development. Because of this, it is not possible to maintain nutrients at optimal simply by increasing or decreasing the strength, or concentration, of a single general purpose fertilizer. The ratio between elements and their variation throughout the plant's lifecycle is a key to optimum growth and productivity.

As a consequence, gardeners, farmers, horticulturists and other plant growers collectively referred to herein as "growers," will typically apply a variety of fertilizers throughout the life of a plant. The present compositions and methods provide a simple building-block method for the grower to easily mix a huge range of precise fertilizer blends.

The present invention contemplates addressing the several issues in plant nutrient delivery. One issue to be addressed is the life cycle of a plant: plants grow and bloom along a continuum. A plant does not, typically, shift from one growth stage to another in a digital fashion. The process is an analog one, where the need for one nutrient decreases gradually as the need for another gradually increases. The more frequently the formula is adjusted throughout a plant's life, the more closely the mixture can follow the optimal ratio.

Additionally, different types of plants have different needs throughout their life cycles. To optimally meet the nutritional needs of the multiple stages of a life cycle for hundreds of different types of plants, over a range of environmental variations like field and greenhouse, summer, and winter, requires many different fertilizer formulas.

Because, commercially, it is typically not practical to manufacture, purchase or store an exhaustive or even extensive range of different fertilizer formulations, growers commonly try to formulate optimal, or near optimal mixtures by mixing a handful of basic fertilizer products in different ratios throughout the life cycle of a plant. Typically the measuring and mixing is by weight percentages, or may be volumetric for less sophisticated growers.

There may be drawbacks of such mixtures, however. A first drawback is that an optimal mixture is seldom a simple integral ratio of small numbers, such as "three parts of a first fertilizer and two parts of a second fertilizer." If an optimal ratio is closer to one hundred to one, and the grower does not need one hundred measures of fertilizer, the grower scales back the total amount of fertilizer and "eye-balls" the amounts used. The process immediately becomes an inexact science, forming a sub-optimal fertilizer.

Another potential drawback with volumetric measuring is that granulated solids, particularly fertilizers, can "clump" together, upsetting the measured volume required for an ideal ratio. Variations in the densities of fertilizers can occur through settling, impurities, and a variety of other causes. Moreover, in large commercial operations, fertilizers may not be placed in tidy graduated flasks before mixing. They can be dumped together from large bins or scoops lacking exact gradations, or being filled in very rough and inexact amounts. Air pockets can also form in a volume, affecting the actual amount of fertilizer used.

Another potential drawback with volumetric mixing, in a very practical sense, is the language barrier. For example, in growing hydroponic tomatoes, the same fertilizer may be marketed in Mexico, Iran and China. Instructions for optimal fertilizer mixtures in Spanish will be of little value in Chinese or Farsi.

In short, volumetric mixing of fertilizer formulas to obtain a particular formula for a particular stage of life of a particular plant can be inexact, tedious, and difficult to communicate from language to language.

As set forth in Section I below, "Mixable Plant Fertilizer Components Based on Color," the present invention encompasses compositions and methods for the grower or user to determine upon visual inspection that proper nutrients are delivered by a colorimetric visual inspection.

As set forth in Section II below, "Two-component Blendable Plant Fertilizers, Related Kits and Methods," the present invention also provides for two-component fertilizer compositions and related embodiments that permit continuous modulation of nutrient combinations while substantially defeating the formation of precipitates, particularly those formed by reactive calcium.

As set forth in Section III below, "Dual Component Plant Fertilizer Mixes Based On Color," the present invention provides compositions and methods for two-component plant fertilizer component systems for the grower or user to determine upon visual inspection that proper nutrients are delivered by colorimetric visual inspection.

In some embodiment, the present invention includes plant fertilizer systems. Most broadly, a system is a composition that may be used according to various methods. The composition, in particular embodiments, is comprised of fertilizer components that, when use in combination, deliver optimum nutrients to a plant. A system may be particularly adapted for use according to a method. A kit may be comprised of system components as discussed below.

Additional embodiments are included. For example, as disclosed herein, a particular embodiment involves a dual component system that substantially avoids precipitation of reactive calcium with other moieties necessary for a complete plant nutrient fertilizer. One aspect involves a dual component system, and a different aspect involves preparing the reactive calcium moieties such that precipitants are substantially avoided. This is fully set forth in Section II.

The present compositions and methods may be used alone or in any combination with each other or with other plant growing compositions or methods as part of a plant nutrient protocol. The present compositions and method may broadly be applicable to any plant growth medium, but may be particularly suitable for hydroponics, as this growing method requires supplying the complete nutritional needs of the plant, rather than using soil-based (for instance) nutrient availability.

I. Mixable Plant Fertilizer Components Based on Color

A method of fertilizing plants comprises the steps of mixing a first coloring agent into a first pre-formulated fertilizer having a first nutrient profile; mixing a second coloring agent into a second pre-formulated fertilizer having a second nutrient profile distinct from the first nutrient profile; mixing a first amount of the first pre-formulated fertilizer and second amount of the second pre-formulated fertilizer together to form a first fertilizer mixture having a third nutrient profile; forming a first aggregate hue according to a mixture of the first and second coloring agents in the first fertilizer mixture; comparing the first aggregate hue to a reference hue; determining that a variation exists between the first aggregate hue and the reference hue. The step of comparing may be performed by a digital computer, or by a human agent.

According to one embodiment, the method further comprises the steps of determining from the variation that an addition of the first pre-formulated fertilizer to the first fertilizer mixture is required to conform the first aggregate hue to the reference hue; and adding more of the first fertilizer to the first fertilizer mixture. The first mixture is placed in an aqueous solution and the conductivity is measured to determine a concentration of the first mixture. If the concentration is too low, more of said first fertilizer and more of said second fertilizer are added to the first fertilizer mixture.

The color mixing may be done with concentrates to make a blend of tailored concentrate that may be specialized for various crops and/or particular growth stages of one or more particular crops. Accordingly, the resulting color is indicative of the preferred application of the concentrate blend. For example, a resulting color of a concentrate blend may be keyed to a color indicating the presence of nitrogen in a growth-oriented formulation while another resulting color of a concentrate blend may be keyed to a color indicating the presence of phosphate and/or magnesium in a reproductive-oriented formulation. After a desired color of the concentrate blend is achieved, that concentrate blend may then be added to water to make a solution for application purposes, i.e., a user solution. A specialized concentrate blend may be further blended, i.e., diluted, with water volumetrically, or by weight, to make a user solution. A conductivity meter can yield approximations of a solution's strength but is not a precise indicator of elemental parts-per-million (PpM) since different components and derived blends have varying conductivity. Nonetheless our method still enables growers to achieve functional precision since the reference charts take into account the variations of conductivity/elemental content. For example, monopotassium phosphate and magnesium sulfate, while typically ingredients of fruiting or flowering formulas, show poor conductivity. Diluting instructions and/or conductivity meter readings may be addressed by tables to aid growers, as users, to estimate nutrient strength.

A third fertilizer comprises nutrients selected from among a group consisting of nitrogen, calcium, iron, manganese, zinc, molybdenum, cobalt, nickel and chloride. The third pre-formulated fertilizer is preferably added to the aqueous user solution by itself directly before or after the colorized blends are added. Preferably, the non-colorized fertilizer should not be added to any of the colorized fertilizers in concentrated form to avoid the mix precipitating calcium or magnesium phosphate. More particularly, the calcium is preferably kept separate until dilution in water of the colorized blend or non-colorized fertilizer. So generally, the third pre-formulated fertilizer may be mixed with the first fertilizer mixture to form a second fertilizer mixture prior to applying to plant roots, or after the first mixture has been applied to plant roots. The first fertilizer preferably comprises nutrients selected from among a group of nutrients consisting of nitrogen, phosphorous, potassium, calcium, magnesium and a sulfur compound. The first fertilizer mixture is applied to roots of a plant at a time corresponding to first stage of growth of the plant. An embodiment further comprises the steps of preparing a second fertilizer mixture according to a second reference hue color; and applying the second fertilizer mixture to the plant roots at a time corresponding to second stage of growth of the plant.

A fertilization system comprises a first pre-formulated fertilizer that is impregnated with a first coloring agent; a second pre-formulated fertilizer that is impregnated with a second coloring agent; and a color look-up table including a first hue configured to match a hue that will result from combining the first pre-formulated fertilizer and the second pre-formulated fertilizer at a first predetermined ratio.

The look up table further includes a correlation of the first hue with a type of plant and a first stage of growth in a life of the plant, and an optimal concentration of the first mixture. The look up table can represent the first hue in digital format, or in a colorized format that is sensibly perceived by a person.

A third pre-formulated fertilizer is impregnated with a third coloring agent. The look-up table includes a second hue representing a hue created by a mixture of the first pre-formulated fertilizer and the third pre-formulated fertilizer at a second predetermined ratio. The second hue within the look-up table corresponds to a second stage of growth in the life of the plant. The color look-up table further includes a third hue representing a hue created by a mixture of the second coloring agent and the third coloring agent at a third predetermined ratio, the third hue within the look-up table corresponding to a third stage of life of a plant. Such colorization/look-up can continue as desired.

Experimental results indicate that for a two-part colorized formula—with or without an additional non-colorized blend containing the micro-nutrients, added separately to the water—a "grow blend," i.e., a blend that may be comprised of a high proportion of nitrogen and a low concentration of phosphate, may be yellow in color and the "bloom blend," i.e., a blend that may be comprised of a low proportion of nitrogen and high proportions of phosphate and magnesium may be blue or red in color. This results in a yellowish green color for a blend that may be termed "Grow" comprising a "grow blend" and micronutrients, and a bluish green color for a blend that may be termed "Bloom" comprising a "bloom blend" and micronutrients. An exemplary alternative coloring produces a grow blend that is blue and a bloom blend that is red. Micronutrients may include copper which adds a blue coloring and may include iron which adds a red coloring. Accordingly, adding the micronutrients into the two-part colorized blend may yield a bluish purple for Grow and a reddish purple for Bloom.

In a three-part colorized blend with a fourth non-colorized blend containing micro-nutrients, a balanced blend may have a blue color. In this example, the concentrates are in the primary colors of Yellow, Blue and Red. In this example, yellow may be used for the Grow enhancer, and red may be used for the Bloom enhancer. This results in an exemplary protocol where: the grower starts the plants with a yellowish-green, and transitions through pure green, and later bluish-green, and then pure blue. When reproductive growth is indicated, the grower may mix a bluish-purple transition to a reddish-purple, and may finish the cycle with a mix of pure red. For unique situations yellow can be mixed with the red to make ranges of orange. For example, the orange colored blend may be used as a foliar spray to help with unique nutrient needs, i.e., for orchids.

Recent tests have produced successful blends all necessary elements, including the reactive Calcium and color-difficult elements, e.g., the rust color of iron and the blue color of copper, into a two part complete mix. The color blue may be used for the grow mix—including the copper since it is blue; and the color red may be used for the bloom mix with the iron. If these two concentrates are mixed together directly, they precipitate calcium phosphate. Preferably, one dilutes of a first concentrate in a container with two to four times its volume with water followed by a dilution of a second concentrate in the same container. Accordingly, a resulting semi-concentrate becomes sufficiently diluted to prevent the precipitation and the color is good for comparison to the reference tables. Now we have a unique colorized semi-concentrate that may be mixed with water volumetrically or using conductivity meter to make a 'user' blend.

The fertilizer system may be embodied with two or more colorized pre-formulated fertilizer products. For example, a fertilizer system embodiment may comprise two or three colorized pre-formulated fertilizer products, as well as a third and/or a fourth non-colorized pre-formulated fertilizer product. For a three-color embodiment, the three colorized products may be colorized according to the primary colors red, yellow and blue for reasons that will be explained herein. For a two-color embodiment, the two colorized products may be colorized according to the colors blue and yellow and may be mixed according to color guide ranging from blue, through the many shades of green to yellow.

The first pre-formulated fertilizer product discussed herein will be designated as "General Purpose" formulation, for this example. The General Purpose formulation is a "middle of the road" fertilizer, with a good balance of primary and secondary nutrients discussed above. For exemplary purposes, the coloring agent selected herein for the General Purpose formulation is blue. The General Purpose formulation will normally serve as a "base" fertilizer, which may be supplemented with one of two other pre-formulated colorized fertilizers to form an optimal fertilizer for different plant species at different stages of growth.

The second pre-formulated fertilizer product, herein designated "enhancer" formulation, is basically a nitrogen supplement. It is typically added to another fertilizer, principally to enhance nitrogen. For exemplary purposes, the coloring agent selected herein for the Enhancer formulation is yellow. In some formulation, one may add calcium and/or sulfur and/or some micro-nutrients to the yellow "enhancer" and use it by itself—typically to overcome nitrogen deficiency or as a foliar spray, as may be typical of the two-part complete colorized blend embodiments.

The third pre-formulated fertilizer product herein designated the "Ripen" formulation, is high in phosphorous, magnesium, sulfate, and relatively high in potassium. It has little or no nitrogen. The Ripen formulation is mixed with a red coloring agent. If mixed with the General Purpose formulation, it decreases the ratio of available nitrogen, and increases the ratio of phosphorous in the fertilizer.

In addition to the colorized mixes, various micro-nutrients are included in a fourth mixture of fertilizer. Although calcium is not regarded as a micro-nutrient, because of its chemical reactivity, it is often included in the micro-nutrient mixture. Preferably, calcium nitrate is applied as a soluble calcium source, and this means that the fourth non-colorized blend also contains nitrogen. Some gardeners will use this non-colorized blend plus the red blend to make a very strong user mix for flowering, fruit or seed production when they want to nutritionally encourage the plants, i.e., a final harvest mix. If calcium is stored in a formulation containing phosphorous, it will typically turn into a non-soluble phosphate that is not biologically available to plants. This makes it impractical to add calcium to the General Purpose formulation or the Ripen formulation, both of which contain phosphorous, except in minor amounts. Although calcium could probably be added safely to the Enhancer formulation, a plant's need for calcium over the life cycle remains far more stable than the need for nitrogen. The Enhancer formulation may be used to provide enhanced nitrogen in high levels early in a plant's development, and curtailed around mid cycle. If calcium were therefore to be delivered in conjunction with the Enhancer formulation, a plant would receive excessive calcium in its early stages, and be starved of calcium in its later stages of growth. For this reason, it has been found to be advantageous to include most of the required calcium in the formulation of micro-nutrients. This prevents the calcium from becoming biologically unavailable to the plant, insures that the levels of calcium remain sufficiently stable through the life of a plant since the micronutrient formulation is used consistently through the plants life.

As an alternative, one may deliver suitable reactive calcium according to the compositions and methods presented in Section II below, "Plant Fertilizers Substantially Avoiding Precipitates, Related Kits and Methods." Such compositions and methods may include the present colorimetric agents.

A micro-nutrient such as copper turns a water-based solution blue and a micro-nutrient such as iron turns a water-based solution a caramel color. Because a micro-nutrient combination of iron and copper can turn a water-based solution a caramel-brown in water, it is difficult to colorize them with a color that will not be overpowered in appearance by the natural caramel-brown color, and laboratory results have yielded red blends with iron. Moreover, since the need for micro-nutrients is substantially invariant over the life of most plants, specialized blending is largely unnecessary.

FIG. 1 illustrates a comparison chart or look-up table that is prepared showing hues which are produced at particular mixtures of any two of the three colored precursors discussed above. The comparison chart lists a type of plant, such as a tomato. Embodiments are envisioned wherein a single chart may list multiple plants in parallel columns. The comparison chart correlates a reference hue to a day or week of growth, and also correlates the proper concentration to the listed day. According to the exemplary look up table of FIG. 1, Day 1 is correlated to the color green, and to a concentration level of 800 PpM. The formulation of this color is illustrated as being a combination of the blue, or General Purpose formulation, and the yellow, or Enhancer formulation. That is, at the beginning of the plant's life, it requires the balanced General Purpose formulation, which is colored blue, but must be supplemented by extra nitrogen to facilitate the intense growth of green leaves and stems. The exact green hue depicted in the look-up chart is achieved by mixing the General Purpose formulation with the Enhancer formulation at an exact ratio. By blending a fertilizer until an exact color match is achieved, the ratio of nutrients in the blended fertilizer can be controlled very exactly, for this example.

Although the chart of FIG. 1 depicts the word "green" rather than the actual color, it is understood that, in actual application, look-up tables for use by growers will depict a visual or sensible reference hue corresponding to the proper mixture of fertilizer, not simply the word "green." The grower can then visually compare the color of the fertilizer mixture under preparation with the reference hue in the look-up table, adding more of one ingredient or another until the mixture's color matches the reference hue. It has been estimated that the human eye can distinguish perhaps a million colors. As a result, a very accurate mixture is possible by preparing a tailored fertilizer to match the reference hue in the look up table. In look-up tables used by computers in process control applications, the reference hue corresponding to the proper mixture of fertilizer is advantageously depicted in a binary code. However, because background lighting in factory environments is not constant, embodiments are envisioned wherein a photo-sensitive examination of a fertilizer mixture by a computer will be accompanied by a fresh examination of a visual reference hue in a look up table, and a generation of a new binary code, rather than a comparison against a pre-existing binary code. That is, computer-controlled coloring of the concentrate blend may be embodied via a light sensor, e.g., a charge-coupled device (CCD), having sensitivity across at least a portion of the color spectrum, that may be combined with light color intensity feedback and reference intensity levels in order to effect input valves controlling the addition of constituent colorized ingredients. Electrical conductivity may be expressed in millisiemens (mS) per centimeter (cm) or microsiemens (S)/cm. An aqueous sodium chloride solution having a concentration of 500 parts per million (PpM) of sodium chloride has an electrical conductivity of about 1 mS/cm.

One may, for instance, use a mobile computing device having a camera (such as a mobile phone or tablet computer) to both take a photo of a reference color, and take a photo of a fertilizer mixture under the same conditions. An application may The reference hue correlating to an exemplary Day 10 may be a blue-green hue, and to a concentration level of 780 PpM, e.g., an electrical conductivity measurement of 1.56 mS/cm. This exemplary stage illustrates that the need for nitrogen is still greater than the percentages present in the General Purpose formulation, but the amount of Enhancer formulation added on Day 10 is less than what was added on Day 1.

The reference hue correlating to Day 19 is the blue color, and refers to a concentration level of 710 PpM, e.g., an electrical conductivity measurement of 1.42 mS/cm. Because the chart indicates that there is only one ingredient, no balancing of colors is required in mixing. The only requirement will be to add the proper amount of General Purpose formulation to produce the correct concentration according to a process described in FIG. 2, for this example. The use of the un-blended General Purpose formulation indicates that the nutritional requirements of the plant are "balanced" between leaf production and flower/fruit/seed production.

The reference hue correlating to Day 28 is a purple hue, and the concentration level is 610 PpM, e.g., an electrical conductivity measurement of 1.22 mS/cm. Purple is achieved by adding red and blue together. As discussed above, the red or Ripen formulation contains no nitrogen, and is particularly high in phosphorous, potassium, magnesium and sulfate. By adding the Ripen formulation to the General Purpose formulation, the aggregate levels of nitrogen are reduced below the General Purpose formulation, and the aggregate levels of phosphorous, potassium, magnesium and sulfate are increased above the basic levels found in the General Purpose formulation.

The reference hue correlating to Day 35 is the red color of the Ripen formulation, un-blended with any blue. The concentration level is 605 PpM, e.g., an electrical conductivity measurement of 1.21 mS/cm. As noted above, the Ripen formulation has no nitrogen, but has elevated levels of potassium and phosphorous which are essential for the fruit/seed bearing stages of many plants. As discussed, a mixture of micro nutrients is preferably added separately, or added to the mixture after the color balancing has been performed. The specific details of the above cycle, including the length of days between life cycle events, specific ratios of tailored fertilizer formulations, and concentration levels, are exemplary, but illustrate many features of the present invention.

An advantage of using four precursors or pre-formulated fertilizer mixtures according to the above illustration is that most tailored mixtures for various plant types may be created by mixing only one or two of the artificially colored mixtures together, plus the non-colorized, naturally caramel colored micro-nutrient precursor. It may be readily understood by those familiar with spectral colors that a continuous spectrum exists between any two primary colors, such as blue and yellow, blue and red, or yellow and red. As a result, by mixing two primary colors, if the desired reference hue is not instantly achieved, it is plain to the casual observer which of the two coloring agents must be added to transform the mixture to the desired reference hue. In contrast, if three color combinations were used and the desired hues were not achieved, it would not be so intuitively obvious which ingredients should be increased. Accordingly, the pre-formulated mixtures are advantageously either used individually, or mixed two at a time, but not three at a time. Because a very natural spectrum occurs between primary colors, the colorized pre-formulated mixtures will preferably be colorized according to the three primary colors of the spectrum, yellow, red and blue. However, the use of other coloring agents is envisioned in conjunction with the present invention. From the above example, it is understood that non-colorized formulations such as the micro-nutrients are not added until the color balancing are completed, including arriving at the proper concentration. However, since the micro-nutrients are eventually used to nourish the same plant, at some point they will be combined with the colorized mixture in final aqueous solution. The application of diluted micro-nutrients to a single or colorized blend is preferred in order to minimize precipitation. That is, preferably the micro-nutrients are added to water separately and before added to the colorized blend, or the micro-nutrient may be added to an already diluted colorized blend.

FIG. 2 illustrates a flow chart illustrating an exemplary process of the present invention. This method embodiment is a process set to a calendar of days where a particular day in the growth cycle, i.e., the day of growth, is determined (step 201) and may be located within a look up table corresponding to the point in the life cycle of the plant being fertilized. This may be a day, such as the first day the plant is planted, or an event, such as two days after the beginning of bud formation.

Based on the determined day within the table lookup, identification (step 203) may be made of the associated colors that have previously been associated within the table with the pre-formulated fertilizer or fertilizers used at that point in time in the life cycle. A test (test 205) may be conducted to determine whether two or more colored ingredients are required. If only one pre-formulated fertilizer is used, then the single ingredient is added to water (step 207), and adjusts the concentration level may be adjusted, e.g., by adding incremental volumes of water and/or the single fertilizer (step 209) in to achieve a target concentration level as listed in the lookup table or a reference table or array of values that is preferable correlated to each reference hue. Concentration levels may be measured with an ammeter specifically calibrated to disclose PpM levels and/or Siemens/meter (S/m). Because different mixtures have different conductivity levels, a reading of an electrical conductivity measurement associated with 600 parts per million, i.e., approximately 1.2 mS/cm, for a mixture the green color of day one may actually have a concentration of 850 parts per million. The resulting mixture having its concentration level adjusted accordingly may then be applied as a plant fertilizer (step 211). Optionally, a mixture containing the micro-nutrients that are not colorized may be applied to the target plant or crops (step 213).

Returning to the test of two or more ingredients (test 205), if the lookup table entry determined day of growth indicates that two pre-formulated colorized ingredients are required, then two pre-formulated ingredients may be added together (step 215) and the resultant hue may be compared with the reference hue of the lookup table. If the resultant hue is not a match with the reference hue (test 217), e.g., by a color-based comparison and/or a conductivity comparison, the resultant hue may be adjusted (step 219) by adding portions of one or more of the pre-formulated colorized fertilizers having pigment required for hue adjustment. If the resultant hue of the mixture matches or is approximately close to the reference hue (test 217) on a color basis, the conductivity of the mixture may be tested (step 221) as a subsequent step. If the conductivity test (test 223) indicates that the conductivity is too low, then additional fertilizer of one or more types of ingredients (step 215) may be added or, as an option, adding one or more types of ingredients that also may affect the hue test results (step 219), may be repeated, thereby increasing the concentration level. If the conductivity is not too low (test 223), then the mixture of aqueous fertilizer may be added to the plant or crop (step 229), and, optionally or finally, and if so, preferably based on a separately diluted basis, the necessary micro-nutrients may be added to the aqueous or "user" solution to be given to the plant or crop (step 231).

Figure 3:
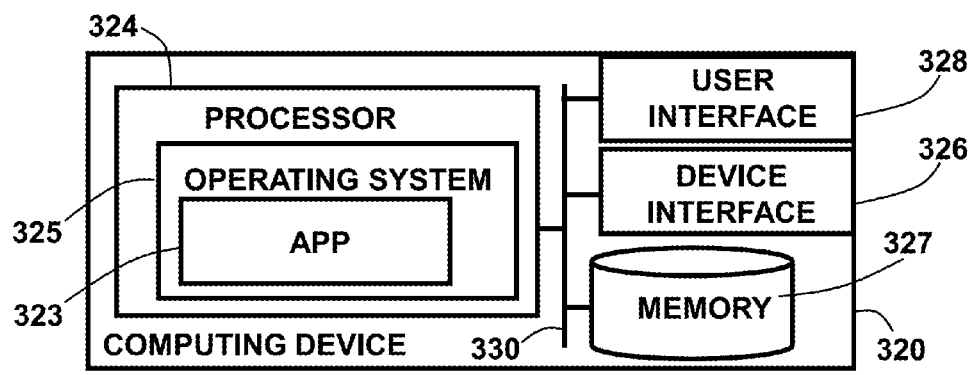
FIG. 3 is a functional block diagram of a computing device embodiment of the present invention.

FIG. 3 depicts a separate computing device as an alternative exemplary operating environment for the colorized fertilizer mixing control process as a portion of an exemplary embodiment of the present invention. The exemplary operating environment is shown as a computing device 320 comprising a processor 324, such as a central processing unit (CPU), addressable memory 327, an external device interface 326, e.g., a universal serial bus (USB) port and related processing, and/or an Ethernet port and related processing, and an optional user interface 328, e.g., an array of status lights and one or more toggle switches, and/or a display, and/or keyboard and/or pointer-mouse system and/or a touch screen. These elements may be in communication with one another via a data bus 330. Via an operating system 325 such as a real-time operating system (RTOS), the processor 324 may be configured to execute steps of a colorized fertilizer mixing based on reference conductivity values and/or color intensity levels, and feedback of conductivity measurements and/or color intensity levels according to a management application 323 according to the exemplary embodiments of the present invention.

Figure 4:
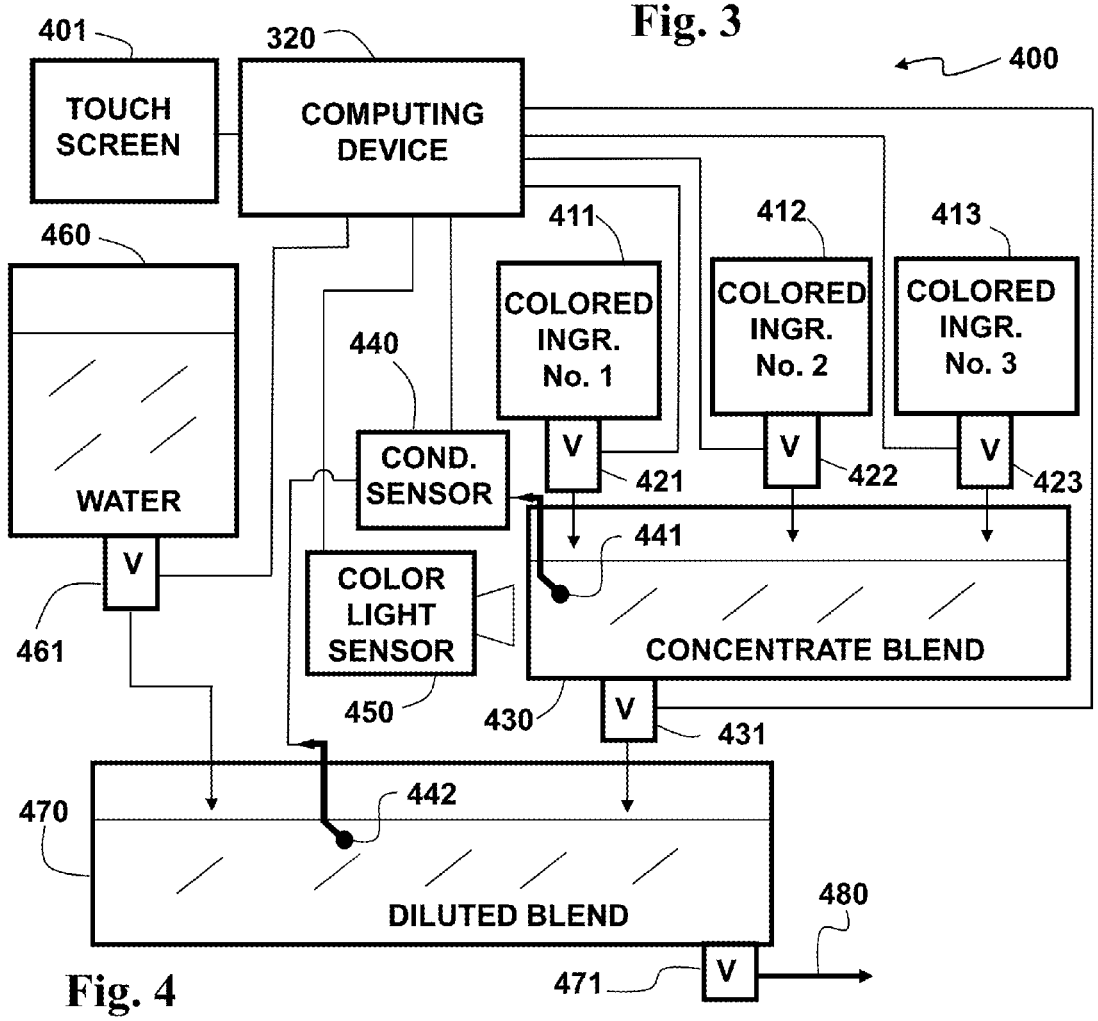
FIG. 4 is a system block diagram of an embodiment of the present invention.

FIG. 4 is an exemplary system depiction 400 of an embodiment of the present invention where a computing device 320 may have a user interface such as a touch screen 401 that displays the state of a concentrate blend 430 and/or a diluted blend 470. A user may start or stop the process and/or change reference settings via the exemplary touch screen 401. The system 400 includes one or more sources 411-413 of colored ingredients where the sources 411-413 each may have an output under the control of a valve 421-423 and each valve may be actuated by commands from the computing device 320. The system may include a conductivity processor or conductivity sensor/measuring device 440 that may be in communication with a conductivity probe 441 that may be submerged in the concentrate blend 430. The conductivity sensor/measuring device 440 also may be in communication with a conductivity probe 442 that may be submerged in the diluted blend 470. A color light sensor 450 such as a charge-coupled device (CCD) camera may in communication with the computing device 320 to provide feedback on the resulting hue of the concentration blend for display purposes and/or for regulation of the hue via the execution of one more valve 421-423 opening and closing commands of one or more colored ingredient sources 411-413. A water source 460 may feed, via a control valve 461 under the control of the computing device 320, to provide the principal volumetric component of the diluted blend 470. The concentrate blend 430 may feed, via a control valve 431 under the control of the computing device 320, to the diluted blend 470. The diluted blend 470 may be output 480 via a valve 471 that may or may not be under the control of the computing device 320.

The above method and apparatus of blending pre-formulated fertilizers into exact ratios according to color comparison has many notable advantages and benefits. On a mechanical level, as noted above, it avoids many of the liabilities and pitfalls associated with volumetric measuring such as inexact scoop size or filling, settling or clumping of a pre-formulated fertilizer, and calculating fractional ratios. Because of the incredible sensitivity and scope of the human eye, the blending of fertilizers according to a reference hue can be done with a high level of accuracy. In addition to these "mechanical" benefits, there is an aesthetic value in the color blending method. For example, school science projects commonly use colors to enhance comprehension, such as snap-together molecules using black for carbon, and other colors for oxygen, nitrogen and hydrogen. On a similar level, school science projects may use hydroponic plant growing to teach certain fundamentals of biology, and enhance the student's intuitive grasp of plant nutrients by having students mix optimal fertilizer blends from color impregnated fertilizer precursors as described above.

In some embodiments, micro-nutrients may be added together with the colored mix after color balance is achieved, or may be added to a plant separately. The process of adjusting the hue and the conductivity may be executed in an analog manner of continuously adding fertilizer and continuously monitoring the conductivity, rather than the step-by-step approach disclosed in the flow chart within FIG. 2. Colorized blend embodiments of the present invention may include non-nutrient additives such as plant growth regulators, which may comprise plant hormones, and these plant growth regulators may trigger special effects in growing plants, e.g., enhanced rooting, stem elongation, uniform flowering and fruit production. Colorized blend embodiments of the present invention may include pesticides that are used to deter insects and diseases, and may be staged concentrations according to a particular phase of growth of the target plant.

II. Two-Component Blendable Plant Fertilizers, Related Kits and Methods

The present compositions and methods provide defined nutritional compositions that may be finely adjusted (or "tuned") depending on the plant, the growth stage, the soil or growing substrate, the environmental conditions (light, temperature, light duration, ambient humidity, wind, temperature fluctuation, etc.)

The present fertilizers and nutrient concentrates typically involve combinations of several concentrates for preparation of complete nutrient solutions. Other liquid fertilizer concentrates address this by partitioning the nutrients into concentrate formulations. For instance, a "2+2" system involves two different concentrates for growth phase, and then a different combination of two different concentrates for a blooming or fruiting phase—requiring four different concentrates.

One of the main challenges when preparing plant nutritional concentrates is to maintain availability of nutrient component for plant uptake. Calcium, a required nutrient, may be reactive with other moieties, such as phosphorus, and precipitate out of a liquid fertilizer solution. Such precipitates are generally irreversible, rendering the calcium and phosphorus (for instance) unavailable for plant nutritional use.

The present invention also encompasses embodiments substantially avoiding precipitation when chemically reactive moieties are combined. Chemically reactive moieties, such as calcium, phosphorus, and magnesium may combine when mixed to form a precipitant. Thus, for instance, calcium and phosphorus are each essential nutrients for plant growth and development. But, both calcium and phosphorus are chemically reactive, and, when combined under suitable conditions, form a precipitant. The calcium/phosphorus precipitant drops out of solution (for instance) and is unavailable for plant nutrition. Calcium, for example, can form calcium phosphate and calcium sulfate. Precipitants once formed, are resistant to going back into solution.

The present invention encompasses embodiments that substantially avoid precipitants by providing separate fertilizer formulations that are combined in suitable ratios independently. The dual system of the present invention contemplates use of only two different fertilizer concentrates that, each independently, may be admixed with the complementary solution to make a complete fertilizer suitable for plant growth or development as desired. Thus, each concentrate component may be viewed as a useful intermediate for a complete fertilizer by combination with its complementary concentrate formulation.

The dual-solution system consists of two fertilizer formulation concentrates that are admixed together into water to make hydroponic or gardening 'user' solution. Only one solution contains reactive calcium. Because calcium is chemically reactive, it is contained in one of the two solutions, away from other moieties that may result in a precipitant, such as phosphate. This solution for ease in practice may also contain nitrogen, and other nutrients typically required in relatively high amounts for the growth phase, and may be referred to in practical application as the "grow" concentrate. The second formulation contains phosphate, another very reactive ingredient. This phosphate containing solution for ease in practice, may contain other micronutrients required in relatively high amounts for blooming or fruiting, and may be referred to in practical application as the "bloom" concentrate.

As indicated, in practical use, the "grow" and "bloom" concentrates are incomplete and not useful as a singular complete fertilizer by itself; it must be blended with the complementary product to make a complete formulation providing for plant nutritional needs.

As discussed above, plant nutrient requirements vary over the life cycle through stages of growth and reproduction (blooming). Currently available fertilizers include those with various numbers of component parts, mixed as required for the appropriate life cycle, such that appropriate nutrient ratios are maintained without deleterious effects incident to the blending itself, such as precipitation rendering constituent moieties unavailable. For example, a product having a "2+2" system involves two concentrates that are blended together with water to make a "grow" user solution. A separate pair of concentrates are similarly blended together to make a "bloom" user solution. This "2+2" system thus involves four products (total) intermixed to make 2 kinds of 'user' solution (one "grow" and one "bloom").

The present fertilizer system uses two component fertilizer formulations to accomplish the same (that is, deliver appropriate nutrient rations over the life of the plant), and further, to permit a finely adjustable (or "tunable") system such that growth, blooming, or fruiting, as well as transitional periods may be suitably fertilized. Particular formulations are set forth below. In this way, one can finely adjust the ration of nutrients so delivered. This may be particularly practicable for hydroponic applications, where fertilizers may be delivered using automated delivery systems. The automated delivery systems, that may be computer-controlled, may be adjusted to delivery select nutrients over select periods of time. As such, the dual-component fertilizer systems, in various embodiments, are particularly practicable for the hydroponic grower or user.

In other embodiments as described in prophetic examples below, the formation of calcium-based precipitants may be substantially avoided by defeating the ability of the reactive calcium to form a precipitate until it reaches the subject plant tissue where it may be taken up and metabolized. Calcium may be fully or partially immobilized, the reactive calcium may be coated to create beads, or the reactive calcium may be chemically modified to create a "pro-" form, releasing the calcium from a chemical moiety under a defined condition. This may have any number of practical embodiments. For instance, calcium may be incorporated into a water-based polymeric system, such as a hydrogel or gelatin. Hydrogel or gelatin (for example) may be impregnated with the calcium, or hydrogel or gelatin beads may be prepared surrounding calcium, such that a controlled release of calcium is provided.

Such water-based polymeric system may be fully or partially solid, or any suitable state. For instance, the entire fertilizer formulation may be sufficiently solidified (or gelled or other suitable viscoelastic properties), such that the constituent moieties are entrapped within a cross-linked polymer scaffold, prevented from forming precipitates.

One skilled in the art may select from a range of suitable gelling or other agents to create a suitable hydrated, yet solid or semi-solid environment preventing nutrient precipitation. Water soluble polymers, such as gelatins or hydrogels, may be suitable. A variety of animal products may be suitable, including collagens or other extracellular matrix polymers. Fish or cow-derived gelatins, or hyaluronic acid based poultry by-products may be suitable. Synthetic polymers, such as hydrogels, or silicon-based materials may be suitable.

The material may be prepared as a liquid, for later solidification. One may prepare a polymeric material with ultraviolet activated crosslinkers such that the material solidifies only upon exposure to ultraviolet light. One skilled in the art will determine suitable materials and methods for avoiding precipitants by the use of immobilization agents.

Other ways to defeat calcium chemical reactivity may be available, such as providing reactive calcium in a "pro-" form by chemically modifying the reactive calcium moiety itself. For instance, the calcium moiety may be reversibly linked to a moiety that releases the calcium under certain conditions. Calcium citrate or other forms of calcium may be applicable.

Alternatively, the pH of the fertilizer may be prepared such that the calcium ions are neutralized by a negative charged environment.

Example IIA

Dual Fertilizer System ("Duo System")

The present working example demonstrates that a two-formulation system permits optimal growth and bloom for plants as required, and further permits titration of optimal nutrient fertilization during transitional periods. Importantly, this nutrient system permits a shift from high nitrogen and calcium during growth phase to higher phosphate, magnesium and sulfate and lower nitrogen during bloom phase using only two stock formulations of concentrate, as opposed to three or more formulations required to be mixed in presently available fertilizer formulations.

As a general matter, relative to each other, the present dual fertilizer system "growth" and the "bloom" incomplete fertilizers are characterized as follows:

| Moiety | Growth | Bloom |
| --- | --- | --- |
| Nitrogen | Higher | Lower |
| Phosphate | Medium | Strong |
| Calcium | Higher | Lower |
| Magnesium | Lower | Higher |
| Sulphate | Lower | Higher |
| Iron | Higher | Lower |

Particularly practicable formulations are set forth herein for the calcium and the non-calcium containing plant fertilizer concentrates.

Two dual-systems are provide below, one adapted for use in "soft water," i.e., water that may be low on calcium and/or magnesium ions, with the addition of a relatively high amount of calcium (the "High Calcium" concentrates). The other "Non-High Calcium" concentrates may be suitable for use where water is not "soft".

| Exemplary "Grow" Plant Fertilizer Concentrate High Calcium | | |
|---|---|---|
| Component | First Plant Fertilizer Concentrate w/w % With Calcium 6-0-4 | |
| Nitrogen | Total Nitrogen (N) 0.9% Ammoniacal Nitrogen 4.1 % Nitrate Nitrogen 1.0% Urea Nitrogen | 6.0% |
| Potassium | Soluble Potash (K$_2$O) | 4.0% |
| Calcium | Calcium (Ca) | 5.0% |
| Boron | Boron (B) | 0.018% |
| Cobalt | Cobalt (Co) | 0.0005% |
| Copper | Copper (Cu) 0.007% Chelated Copper (Cu) | 0.007% |
| Iron | Iron (Fe) 0.066% Chelated Iron (Fe) | 0.066% |
| Manganese | Manganese (Mn) 0.26% Chelated Manganese (Mn) | 0.26% |
| Molydenum | Molybdenum (Mo) | 0.0015% |
| Zinc | Zinc (Zn) 0.007% Chelated Zinc (Zn) | 0.007% |

Derived from: Ammonium Molybdate, Ammonium Nitrate, Calcium Nitrate, Cobalt Sulfate, Copper Nitrate, Diethylenetriaminepentaacetic acid, Ethylenediamine-bis(2hydroxyphenyl) acetic acid, Ethylenediaminetetracetic acid, Potassium Nitrate, Potassium Borate, Urea, Zinc Nitrate.

| Exemplary "Bloom" Plant Fertilizer Concentrate [Complement to High Calcium "Grow" Concentrate] | | |
|---|---|---|
| Component | Second Plant Fertilizer Concentrate w/w % No Calcium 0.3-5-5 | |
| Phosphorus | Available Phosphate (P$_2$O) | 5.0% |
| Potassium | Soluble Potash (K$_2$O) | 5.0% |
| Magnesium | Magnesium (Mg) | 1.5% |
| Sulphur | Sulfur (S) | 2.3% |
| Boron | Boron (B) | 0.01% |
| Cobalt | Cobalt (Co) | 0.0005% |
| Copper | Copper (Cu) 0.003% Chelated Copper (Cu) | 0.003% |
| Iron | Iron (Fe) 0.014% Chelated Iron (Fe) | 0.014% |
| Manganese | Manganese (Mn) 0.01% Chelated Manganese (Mn) | 0.01% |
| Molybdenum | Molybdenum (Mo) | 0.0015% |
| Zinc | Zinc (Zn) 0.003% Chelated Zinc (Zn) | 0.003% |

Derived from: Sodium Molybdate, Cobalt Sulfate, Copper Sulfate, Diethylenetriaminepentaacetic acid, Ethylenediamine-bis(2hydroxyphenyl)acetic acid, Magnesium Sulfate, Potassium Phosphate, Potassium Borate, Zinc Sulfate.

| Exemplary "Grow" Plant Fertilizer Concentrate Non-High Calcium | | |
|---|---|---|
| Component | First Plant Fertilizer Concentrate w/w % "Grow" Concentrate Formulation Non High Calcium | |
| Nitrogen | Total Nitrogen (N) 0.60% Ammoniacal Nitrogen 3.75% Nitrate Nitrogen 1.037% Urea Nitrogen | 5.39% |
| Potassium | Soluble Potash (K$_2$O) | 4.16% |
| Calcium | Calcium (Ca) | 2.50% |
| Chloride | Chloride (Cl) | 0.93% |
| Boron | Boron (B) | 0.018% |
| Cobalt | Cobalt (Co) | 0.75% |
| Copper | Copper (Cu) 0.007% Chelated Copper (Cu) | 0.007% |
| Iron | Iron (Fe) 0.066% Chelated Iron (Fe) | 0.066% |
| Manganese | Manganese (Mn) 0.26% Chelated Manganese (Mn) | 0.26% |
| Molydenum | Molybdenum (Mo) | 1.88% |
| Zinc | Zinc (Zn) 0.007% Chelated Zinc (Zn) | 0.007% |
| asP2O5 | | 0.00% |
| asK2O | | 5.03% |
| as SO4 | | 0.00% |

| Exemplary "Bloom" Plant Fertilizer Concentrate Complement To Non-High Calcium "Grow" Concentrate | | |
|---|---|---|
| Component | Second Plant Fertilizer Concentrate w/w % No Calcium [Complement to Non-High Calcium Grow Mix] | |
| Nitrogen | Total Nitrogen (N) 0.80% Ammoniacal Nitrogen 0.80% Nitrate Nitrogen 0.0% Urea Nitrogen | 1.60% |
| Calcium | Calcium 0.0% | |
| Phosphorus | Available Phosphate (P$_2$O) | 2.53% |
| Potassium | Soluble Potash (K$_2$O) | 3.28% |
| Magnesium | Magnesium (Mg) | 1.47% |
| Chloride | Chloride | 0.0% |
| Sulphur | Sulfur (S) | 1.92% |
| Boron | Boron (B) | 0.011% |
| Cobalt | Cobalt (Co) | 0.0077% |
| Copper | Copper (Cu) 0.003% Chelated Copper (Cu) | 0.003% |
| Iron | Iron (Fe) 0.014% Chelated Iron (Fe) | 0.014% |
| Manganese | Manganese (Mn) 0.01% Chelated Manganese (Mn) | 0.007% |
| Molybdenum | Molybdenum (Mo) | 0.0193% |
| Zinc | Zinc (Zn) 0.003% Chelated Zinc (Zn) | 0.003% |
| As P2O5 | | 5.82% |
| As K2O | | 3.96% |
| As SO4 | | 5.77% |

As can be seen by the formulas for the exemplary "Grow" and "Bloom" formulations, the grow phase provides higher concentrations of nitrogen, calcium, iron and as well as trace minerals. The "Bloom" formulation contains (relative to the "grow" formulation) more phosphorus, magnesium and sulphur. Trace elements are in lower amounts, but not uniformly and nitrogen is reduced.

Additional ingredients may be added such as seaweed extracts, humic acids, protein hydrolysates, plant extracts and organic blends and ingredients. Organic nitrogen sources may include agar-agar, or fish gelatins.

As may be seen, the present two-component system permits a shift from high nitrogen and calcium during the growth phase to a higher phosphate, magnesium and sulphate phase (with lower nitrogen) during the blooming and fruiting phase, while keeping a relatively simple system of two components. The problem with calcium reacting to form precipitates is avoided by separating reactive calcium from other reactive species, notably phosphorus and sulphur. When combined, the solutions are dilute enough to substantially avoid precipitants.

Precisely formulated specialized mixes are possible by varying ranges as needed, and the present two-concentrate formulations are particularly suitable for hydroponic plantings. All plant needs are met with precisely calibrated blends including NPK, secondary and ranges proven effective for hydroponics and therefore by definition, complete. Required nutrients and micronutrients are provided in precise amounts that may be calibrated and administered as needed.

As also described further herein, combining the amounts of two separate plant fertilizer concentrates may be suited to the colorimetric gradations of other embodiments described herein. There may be particularly sensitive means to precisely measure combinations. For instance, particularly sensitive ultraviolet, chemiluminescent, fluorescent or other detectable markers may be so used if extreme precision is desired, for example.

For ease in use and practical application, the present invention includes plant fertilizing kits containing two separate containers of the present plant fertilizer compositions that when combined, provide complete plant nutrients; it is contemplated that such a kit may comprise one plant fertilizer concentrate containing reactive calcium, and another plant fertilizer concentrate with one or more moieties that would precipitate the reactive calcium if combined. It is preferred, but not required, that such plant fertilizer concentrates are in liquid form; there may be desiccated or gelatinous forms that, when diluted, provide the advantages noted herein.

Typically, a plant fertilizing kit comprising two separate plant fertilizer concentrate components is embodied in two liquid concentrates that are mixed together into water to make hydroponic or gardening 'user' solution. One liquid concentrate functions as a 'grow' fertilizer, in that it promotes plant growth; it typically contains the growth fertilizer components plus micro-nutrients as well as all the calcium needed. The second liquid concentrate functions as a 'bloom' fertilizer, in that it promotes bud break and flowering; this bloom concentrate contains the bloom fertilizer components and contains the complete phosphate component. Each plant fertilizer concentrate component is incomplete and not useful as a hydroponic (or other) fertilizer by itself and must be combined with its co-packaged complementary product to make a complete blend.

Thus, one embodiment of the present invention may be a plant fertilizing kit comprising two separate plant fertilizer concentrate components wherein:
 (a) Together the two plant fertilizer concentrate components provide complete nutrients for plant fertilization, but each component individually does not provide complete nutrients for plant fertilization;
 (b) Only one of the two plant fertilizer concentrate components comprises reactive calcium;
 (c) Optionally, the plant fertilizer concentrate component not containing reactive calcium comprises another moiety reactive with reactive calcium to form a precipitate under suitable conditions.

Another embodiment of the present invention may be a plant fertilizing kit comprising two separate plant fertilizer concentrate components wherein:
 (a) Together the two plant fertilizer concentrate components provide sufficient nitrogen, phosphorus, calcium, magnesium, sulphur, and iron, but each component individually does not provide complete nutrients for plant fertilization;
 (b) Only one of the two plant fertilizer concentrate components contains reactive calcium;
 (c) The plant fertilizer concentrate component not containing reactive calcium comprises another moiety reactive with reactive calcium selected from among phosphorus, nitrogen and sulfur.

Particular embodiments of the present invention include those illustrated by the Exemplary Growth and Exemplary Bloom formulations described above. Particular kits include those with compositions set forth in the various embodiments.

One may vary the amounts of moieties in either of the components except that providing within a single component both reactive calcium as well as a moiety that precipitates reactive calcium defeats the purpose of providing a complete fertilizer and should be substantially avoided. Therefore, the reactive calcium-containing component should be essentially free of calcium-precipitating moieties, including but not limited to calcium-precipitating phosphorus and calcium-precipitating sulphur moieties. One may, depending on the purpose, vary any constituent moiety by 0.001% up to about 25% (at any amount within the range). One may vary any constituent moiety by 0.1%, 1.0%, 5%, 10% or 25%, for example. One may vary any constituent moiety by about 1%, 5%, 10%, 20%, 25% or 50% or more, in terms of amount of variance from the listed amounts provided.

The reactive calcium-containing concentrate component may contain virtually any of the nutrients except preferably it should be substantially free of phosphorus or phosphate moieties that may cause undue precipitation as described here. The phosphorus moieties and reactive calcium moieties may be combined as a diluted solution, such that there is sufficient dilution to substantially avoid precipitant formation. One may optionally add colorimetric or other detectable indicators in such dilute state. The present components may be used in combination with any number of plant growth media, but, as discussed herein, is particularly suited to hydroponic growing requiring complete nutritional media administered exogenously, rather than from soil or other growing media.

Methods of Use

The present methods involve admixing the Growth and Bloom formulas in water and applying to the planting medium or hydronic solution. Depending on the initial concentrations, the ratios of "grow" to "bloom" may range from 1:1, 1:2, 1:3, 1:4 and any other suitable range as a skilled practitioner will recognize. Using the Exemplary "Growth" formula and Exemplary "Bloom" formula above, the following methods of use may be practiced. Particular methods of use of various two-component systems are presented in GenHydro catalog for 2011.

Rapid Early Growth:

A typical use is to start with three teaspoons (15 ml) per gallon water of a plant fertilizer concentration component containing calcium as illustrated herein ("grow" concentration). This is added to water and stirred for first dilution. Next the grower will add 1 teaspoon of non-calcium, phosphorus-containing plant fertilizer concentration component ("bloom") and stir into the water to make a user solution for early rapid growth.

Transitional Growth to Flowering or Fruiting:

As the plants mature and prepare for transition to flowering or fruiting, the grower may blend a 'transitional' solution. A typical use is two teaspoons of a plant fertilizer concentration component containing calcium as illustrated herein ("grow") into a gallon of water and stirred, then add 2 teaspoons of non-calcium containing, phosphorus containing concentrate ("bloom") into the water and stir. This makes general purpose or 'transitional' nutrient fertilizer blend between the grow and bloom phases of plant life.

Blooming or Fruiting:

A typical use is one teaspoon (5 ml) of a plant fertilizer concentration component containing calcium as illustrated herein ("grow") into a gallon of water and stirred, then add three teaspoons (15 ml) of non-calcium containing, phosphorus containing concentrate ("bloom") into the gallon of water and stir. This fertilizer blend is particularly suited for flowering and fruiting plants, such as tomatoes for example.

The following are tables providing formulas for various combinations that may be used. While the present invention contemplates defeating the precipitation of reactive calcium by using the present dual fertilizer concentrate components, one may vary other components as needed, taking into consideration soil, water, the mixture or a variety of variables as a skilled practitioner will recognize. So long as substantially all reactive calcium is not in contact with phosphorus (or phosphate) as a concentrate, the present invention provides that the calcium may be delivered to the subject plant. The other nutrients may vary as needed, particularly by 1%, 5%, 10%, 20%, 25% or 50% or more, in terms of amount of variance from the listed amounts provided. One will appreciate that certain nutrients may not be in undue excess, for instance molybdenum or cobalt may be taken up by grasses, and cause undue toxic reaction in grazing animals.

Note on rounding integers: Because fertilizers are typically regulated by state or national authorities, the labels for such fertilizers may have to comply with the local jurisdictional requirements. Some of the jurisdictions require that the concentration numerical values are "rounded" in a particular fashion. Where applicable, a practitioner may label a product under rules that permit decimal values to the 0.1 below 1.0%, but require numerical values for concentrations above 1.0% to be rounded up the nearest whole integer. As such, the term "about" when used in conjunction with a numerical value includes such concept of rounding.

Tables 1A and 1B provide compositional analysis of the exemplary high calcium and non-high calcium concentrates above.

Table 2A-2F presents an example formula for a "Grow" and a "Bloom" mix using the Exemplary High Calcium Grow and Bloom Concentrates, above.

Table 3A presents and example formula for a "Grow" and a "Bloom" mix using the Exemplary Non-High Calcium Grow and Bloom Concentrates, above.

Explanatory Notes:

Units of Measurement

PpM (parts per million)=Resultant PpM by Element 5 ml=1 teaspoon 1.25 ml/L=1 teaspoon/Gallon 2.5 ml/L=1 tablespoon/Gallon 3.75 ml/L=1 tsp (1 Tablespoon)/Gallon An asterisk (*) denotes that the range of molybdenum (Mo) and cobalt (Co) is expressed in terms of weight/weight percentage, as a range of 0.0 to 0.0008% as a skilled practitioner will appreciate.

TABLE 1A

Exemplary "Grow" and "Bloom" Compositional Analysis
High Calcium Formulation

| Solids Component | Grams/liter "Grow" | Grams/liter "Bloom" |
|---|---|---|
| $KH_2PO_4$ | | 112.0 |
| $MgSO_4.7H_2O$ | | 175.0 |
| $MgCl_2.6H_2O$ | | |
| $Mg(NO_3)_2.6H_2O$ | | |
| $KNO_3$ | 94.0 | 10.0 |
| $NH_4NO_3$ | 20.0 | 5.0 |
| Urea | 10.0 | |
| $Ca(NO_3)_2$ | 310.0 | |
| $CaCl_2$ | 0.0 | |
| $K_2SO_4$ | | 20.0 |
| KCl | 10.0 | 5.0 |
| $K_2CO_3$ | 0.4 | |
| Fe 11% | 7.0 | 1.4 |
| MnEDTA | 3.0 | 0.800 |
| $H_3BO_3$ | 1.0 | 0.600 |
| ZnEDTA | 0.80 | 0.300 |
| CuEDTA | 0.60 | 0.230 |
| $Mo(NH_4)_2O_4$ | 0.045 | 0.045 |
| $CoSO_4$ | 0.023 | 0.023 |
| Thiamin | 0.1 | |
| Fulvic | 4.0 | 2.0 |
| citric | 1.0 | 2.0 |
| FF per kl batch | | |
| Water; density: | 1.00 | |

TABLE 1B

Exemplary "Grow" and "Bloom" Compositional Analysis
Non-High Calcium Concentrates

| Solids Component | Grams/liter "Grow" | Grams/liter "Bloom" |
|---|---|---|
| $KH_2PO_4$ | | 130.0 |
| $MgSO_4.7H_2O$ | | 170.0 |
| $MgCl_2.6H_2O$ | | |
| $Mg(NO_3)_2.6H_2O$ | | |
| $KNO_3$ | 94.0 | |
| $NH_4NO_3$ | 40.0 | 52.0 |
| Urea | 26.0 | |
| $Ca(NO_3)_2$ | 154.0 | |
| $CaCl_2$ | 0.0 | |
| $K_2SO_4$ | | |
| KCl | 23.0 | |
| $K_2CO_3$ | 0.40 | |
| Fe 6%; 11% | 7.0 | 1.40 |
| MnEDTA | 3.0 | 0.800 |
| $H_3BO_3$ | 1.0 | 0.600 |
| ZnEDTA | 0.80 | 0.300 |
| CuEDTA | 0.60 | 0.230 |
| $Mo(NH_4)_2O_4$ | 0.045 | 0.045 |
| $CoSO_4$ | 0.023 | 0.023 |
| Thiamin | 0.10 | |
| Fulvic | 4.0 | 2.0 |
| citric | 1.0 | 2.0 |

Table 2A presents an example of a formula for a growth mix and a bloom mix using the exemplary High Calcium Grow and Bloom concentrates above.

TABLE 2A

Blends of Exemplary High Calcium Concentrates for Growth Mix and Bloom Mix
[Parts per million, PpM]

| Element | "Grow" Mix PpM | "Bloom" Mix PpM |
|---|---|---|
| NN | 150.7 | 78.7 |
| AN | 32.4 | 37.7 |
| UreaN | 38.9 | 13.5 |
| Total N | 222.0 | 129.9 |
| K | 196.8 | 176.9 |
| S | 24.0 | 72.1 |
| P | 31.6 | 94.8 |
| Ca | 93.8 | 32.5 |
| Mg | 18.4 | 55.2 |
| Cl | 35.1 | 12.2 |
| Fe | 2.6 | 1.4 |
| Mn | 1.0 | 0.6 |
| Zn | 0.3 | 0.2 |
| B | 0.8 | 0.6 |
| Cu | 0.3 | 0.2 |
| Mo* | 0.0-0.0008% | 0.0-0.0008% |
| Co* | 0.0-0.0008% | 0.0-0.0008% |
| Sum PpM: | 848.7 | 706.5 |
| as CaO | 3.50% | |
| as MgO | 2.44% | |
| as SOS | 4.81% | |

Grow Mix: Grow Concentrate to Bloom Concentrate (High Calcium) Ratio 3:1
3 teaspoons "Growth" mix/gallon (15 ml/gallon)
1 teaspoon "Bloom" mix/gallon (5 ml/gallon)
Bloom Mix: Grow Concentrate to Bloom Concentrate (High Calcium) Ratio 1:3
1 teaspoon "Growth" mix/gallon (5 ml/gallon)
3 teaspoons "Bloom" mix/gallon (15 ml/gallon)

Table 2B presents an example of a formula for a growth mix and a bloom mix using the exemplary High Calcium Grow and Bloom concentrates above.

TABLE 2B

Blends of Exemplary High Calcium Concentrates for Growth Mix and Bloom Mix
[Parts per million, PpM]

| Element | Example "Grow" mix Use: "Grow" 5.0 teaspoons/gallon Use: "Bloom" 2.5 teaspoons/gallon Grow Mix | Example "Bloom" Mix Use: "Grow" 2.5 teaspoons/gallon Use: "Bloom" 5.0 teaspoons/gallon Bloom Mix |
|---|---|---|
| NN | 207.6 | 133.7 |
| AN | 49.9 | 54.9 |
| UreaN | 51.8 | 25.9 |
| Total N | 309.3 | 214.5 |
| K | 289.8 | 267.7 |
| S | 48.1 | 96.2 |
| P | 63.2 | 126.4 |
| Ca | 125.0 | 62.5 |
| Mg | 36.8 | 73.6 |
| Cl | 46.7 | 23.4 |
| Fe | 3.6 | 2.3 |
| Mn | 1.5 | 1.0 |
| Zn | 0.4 | 0.3 |
| B | 1.1 | 1.0 |
| Cu | 0.4 | 0.3 |
| Mo* | 0.0-0.0008% | 0.0-0.0008% |
| Co* | 0.0-0.0008% | 0.0-0.0008% |
| Sum PpM: | 1235.2 | 1083.8 |
| as CaO | 3.50% | |
| as MgO | 2.44% | |
| as SOS | 4.81% | |

Table 2C presents an example of a formula for a growth mix and a bloom mix using the exemplary High Calcium Grow and Bloom concentrates above.

TABLE 2C

Blends of Exemplary High Calcium Concentrates for Growth Mix and Bloom Mix
[Parts per million, PpM]

| Element | Example "Grow" mix Use: "Grow" 7.5 teaspoons/gallon Use: "Bloom" 2.5 teaspoons/gallon Grow Mix | Example "Bloom" Mix Use: "Grow" 2.5 teaspoons/gallon Use: "Bloom" 7.5 teaspoons/gallon Bloom Mix |
|---|---|---|
| NN | 301.4 | 153.7 |
| AN | 64.8 | 74.8 |
| UreaN | 77.8 | 25.9 |
| Total N | 443.9 | 254.4 |
| K | 393.7 | 349.6 |
| S | 48.1 | 144.3 |
| P | 63.2 | 189.7 |
| Ca | 187.6 | 62.5 |
| Mg | 36.8 | 110.4 |
| Cl | 70.1 | 23.4 |
| Fe | 5.3 | 2.7 |
| Mn | 2.1 | 1.2 |
| Zn | 0.6 | 0.4 |
| B | 1.6 | 1.2 |
| Cu | 0.6 | 0.4 |
| Mo* | 0.0-0.0008% | 0.0-0.0008% |
| Co* | 0.0-0.0008% | 0.0-0.0008% |
| Sum PpM: | 1697.5 | 1394.5 |
| as CaO | 3.500 | |
| as MgO | 2.44% | |
| as SOS | 4.81% | |

Table 2D presents an example formula for a "Grow" and a "Bloom" mix using the Exemplary High Calcium Grow and Bloom Concentrates, above.

TABLE 2D

Blends of Exemplary High Calcium Concentrates for Growth Mix and Bloom Mix
[Parts per million, PpM]

| Element | Example "Grow" mix Use "Grow" 1.3 teaspoons/gallon "Grow" PpM | Example "Bloom" Mix Use "Grow" 2.5 teaspoons/gallon "Bloom" PpM |
|---|---|---|
| NN | 56.9 | 113.8 |
| AN | 17.5 | 34.9 |
| UreaN | 13.0 | 25.9 |
| Total N | 87.3 | 174.6 |
| K | 92.9 | 185.8 |
| S | 24.0 | 48.1 |
| P | 31.6 | 63.2 |
| Ca | 31.3 | 62.5 |
| Mg | 18.4 | 36.8 |
| Cl | 11.7 | 23.4 |
| Fe | 1.0 | 2.0 |
| Mn | 0.4 | 0.8 |
| Zn | 0.1 | 0.2 |
| B | 0.4 | 0.7 |
| Cu | 0.1 | 0.3 |
| Mo* | 0.0-0.0008% | 0.0-0.0008% |
| Co* | 0.0-0.0008% | 0.0-0.0008% |
| Sum PpM | 386.5 | 773.0 |
| as CaO | 3.500 | |
| as MgO | 2.44% | |
| as SOS | 4.81% | |

Table 2E presents an example formula for a "Grow" and a "Bloom" mix using the Exemplary High Calcium Grow and Bloom Concentrates, above.

TABLE 2E

Blends of Exemplary High Calcium Concentrates for
Growth Mix and Bloom Mix
[Parts per million, PpM]

| Element | Example "Grow" mix<br>Use: "Grow" 2.5<br>teaspoons/gallon<br>PpM 1 | Example "Bloom" Mix<br>Use: "Grow" 3.8<br>teaspoons/gallon<br>PpM 2 |
|---|---|---|
| NN | 113.8 | 170.6 |
| AN | 34.9 | 52.4 |
| UreaN | 25.9 | 38.9 |
| Total N | 174.6 | 261.9 |
| K | 186.8 | 278.7 |
| S | 48.1 | 72.1 |
| P | 63.2 | 94.8 |
| Ca | 62.5 | 93.8 |
| Mg | 36.8 | 55.2 |
| Cl | 23.4 | 35.1 |
| Fe | 2.0 | 3.0 |
| Mn | 0.8 | 1.2 |
| Zn | 0.2 | 0.4 |
| B | 0.7 | 1.1 |
| Cu | 0.3 | 0.4 |
| Mo* | 0.0–0.0008% | 0.0–0.0008% |
| Co* | 0.0–0.0008% | 0.0–0.0008% |
| Sum PpM | 773.0 | 1159.5 |
| as CaO | 3.50% | |
| as MgO | 2.44% | |
| as SOS | 4.81% | |

Table 2F presents an example formula for a "Grow" and a "Bloom" mix using the Exemplary High Calcium Grow and Bloom Concentrates, above.

TABLE 2F

Blends of Exemplary High Calcium Concentrates for
Growth Mix and Bloom Mix
[Parts per million, PpM]

| Element | Example "Grow" mix<br>Use: "Grow" 3.8<br>teaspoons/gallon<br>Use: "Bloom" 1.9<br>teaspoons/gallon<br>PpM 1 | Example "Bloom" Mix<br>Use: "Grow" 1.9<br>teaspoons/gallon<br>Use: "Bloom" 3.8<br>teaspoons/gallon<br>PpM 2 |
|---|---|---|
| NN | 207.3 | 107.5 |
| AN | 12.8 | 8.6 |
| UreaN | 15.2 | 7.6 |
| Total N | 235.3 | 123.6 |
| K | 202.9 | 200.4 |
| S | 41.2 | 81.2 |
| P | 40.7 | 80.2 |
| Ca | 185.1 | 92.6 |
| Mg | 28.0 | 55.2 |
| Cl | 15.4 | 7.7 |
| Fe | 2.8 | 1.8 |
| Mn | 1.1 | 0.8 |
| Zn | 0.3 | 0.2 |
| B | 0.9 | 0.7 |
| Cu | 0.3 | 0.2 |
| Mo* | 0.0–0.0008% | 0.0–0.0008% |
| Co* | 0.0–0.0008% | 0.0–0.0008% |
| SumPpM | 989.3 | 768.3 |
| Co PPM | | |
| asP2O5 | | |
| asK2O | | |
| as SO4 | | |

Table 3A presents an example formula for a "Grow" and a "Bloom" mix using the Exemplary Non-High Calcium Grow and Bloom Concentrates, above.

TABLE 3A

Blends of Exemplary Non-High Calcium Concentrates for
Growth Mix and Bloom Mix
[Parts per million, PpM]

| Element | Example "Grow" mix<br>Use: Grow 3.8<br>teaspoons/gallon<br>Use: Bloom 1.3<br>teaspoons/gallon<br>PpM 1 | Example "Bloom" Mix<br>Use: Grow 1.3<br>teaspoons/gallon<br>Use: Bloom 3.8<br>teaspoons/gallon<br>PpM 2 |
|---|---|---|
| NN | 150.7 | 78.7 |
| AN | 32.4 | 37.7 |
| UreaN | 38.9 | 13.5 |
| Total N | 222.0 | 129.9 |
| K | 196.8 | 176.9 |
| S | 24.0 | 72.1 |
| P | 31.6 | 94.8 |
| Ca | 93.8 | 32.5 |
| Mg | 18.4 | 55.2 |
| Cl | 35.1 | 12.2 |
| Fe | 2.6 | 1.4 |
| Mn | 1.0 | 0.6 |
| Zn | 0.3 | 0.2 |
| B | 0.8 | 0.6 |
| Cu | 0.3 | 0.2 |
| Mo* | 0.0–0.0008% | 0.0–0.0008% |
| Co* | 0.0–0.0008% | 0.0–0.0008% |
| Sum PpM: | 848.7 | 706.5 |

Example IIB

Defeating Reactive Calcium for Preventing the
Formation of Precipitates in Plant Fertilizer
Concentrates This is a prophetic example of an embodiment where reactive calcium is rendered substantially incapable of forming a precipitate with phosphorus or other moieties that may result in a precipitate.

The above working example presents one way to delimit exposure of reactive calcium to phosphorus or other reactive moieties by using separate concentrated components as a fertilizer, keeping reactive calcium in one component, and reactive phosphorus in the other. The above dual system provides advantages and may be finely tunable for a variety of plant nutritional needs.

Nevertheless, the present invention also provides a fertilizer composition where the reactive calcium itself is singled out and prevented from contacting other moieties that could result in precipitation. This may be done by immobilizing the calcium, by coating the calcium, or by derivatizing the calcium, for example. Other means may be available to those of skill in the art in view of the present disclosure, and a fertilizer composition may contain one, or a variety of reactive calcium moieties in any combination of free (that is, free reactive calcium), immobilized (as described further below), coated (as described further below), or derivatized (described further below).

A substrate composition may be used to provide a controlled release and delivery of reactive calcium to the subject plant tissue. The material may be sufficiently water soluble such that the plant tissue takes up the reactive calcium as a nutrient. Reactive calcium may be immobilized in a matrix, for example, such that it degrades in a controlled fashion and contact with other reactive components is limited. A variety of controlled release materials are available, and a composition may be inert, or may itself provide ingredients for plant growth or bloom. The material may be impregnated with calcium, and may be independent of other nutrient solutions. Preferably, for use in an aqueous environment, particularly a hydroponic environment, the material is water soluble.

Such material may be used to coat calcium particles such that beads are formed, for instance. One may coat calcium so as to make calcium beads, either as a part of a fertilizer concentrate or independently. For a hydroponic solution, one may independently add coated calcium beads in an amount suitable for delivery over time as needed, in coordinated fashion with the delivery of moieties that may otherwise precipitate, such as phosphorus.

A variety of different modalities may be used, such as layered coatings for sustained release of calcium over time, or combinations of nutrients such that particular nutrients are released in sequence. For hydroponic nutrients, one could make a solid substrate comprised of numerous layers, each dissolving at a predetermined rate such that the dissolution is timed to coordinate with the growth/bloom phase of the plant. One would therefore, for a known plant growth cycle, put in a single solid plant fertilizer that dissolves to coordinate to release the appropriate nutrients. In this way, reactive calcium could be released so that it is not admixed with phosphorus to result in unusable precipitant.

The entire fertilizer composition may be gellated, such that otherwise reactive moieties, such as calcium and phosphorus are released in a controlled fashion. For instance, animal-based gelatins, such as cow or fish products, may be used. Synthetic collagens or other gel-type macromolecules may be used, such as hydrogels. The gel materials may be a substrate for plant growth, and provide hydration in addition to a defined release of nutrient for the plant materials. Gel materials may be used as a liquid, and cross linked using ultraviolet-activated cross linkers or other cross linking activation means, for ease of use in some circumstances.

One may derivatize the calcium so as to make a "pro" form that is less reactive until suitable conditions are achieved, such as pH or other conditions. Calcium citrate may be used, or other forms of calcium that release reactive calcium under particular pH. Chemically modified calcium may be modified using a linking agent, such that the linker releases the protective moiety under predefined conditions. A linking agent includes a polymer that may be cleaved under certain environmental conditions (pH, salt, heat, enzymatic or metabolite, etc.). The moiety that otherwise protects the reactive calcium should preferably not be toxic to the plant, as one can readily ascertain.

III. Two-Component Blendable Plant Fertilizers Based on Color, Additional Fertilizer Systems, Related Kits and Methods One may prepare various embodiments of color-based mixable dual fertilizer components and systems. Two, three or four (or more) components may be colorized and used two at a time during a phase of a plant life cycle. The components are "tunable" as discussed above, in that optimum nutrients are delivered during appropriate time periods during the life cycle of plant.

One such embodiment involves the preparation of three fertilizer components, where, at a suitable point during the plant life cycle, two of the three components are mixed. At other points in the plant life cycle, one or all three components may be mixed.

Another embodiment involves the preparation of four fertilizer components, where, at a suitable point during the plant life cycle, two of the four components are mixed. Similarly, at other points, one, three or four components may be used.

Mixing to a desired concentration is determined colorimetrically, as described above. Where a formula containing a chelation agent is used, the chelation agent may be capable of bleaching from a dark to light color in the presence of hydrogen ions. This may be particularly useful where a color-assay is used to determine the appropriate amount of fertilizer component.

Chelation agents for micronutrients include, for example (with trade name and IUPAC name):
EDTA (ethylenediamine-N,N-tetraacetic acid)
DTPA (N-carboxymethyliminobis(ethylenenitrilo)tet-raacetic acid)
EDDHA (Ethylenediamine-N,N'-bis(2-hydroxyphenylacetic acid)
HEEDTA (N-(2-hydroxyethyl)ethylenediamine-N,N',N'-triacetic acid)
EDDHMA (Ethylenediamine-N,N'-bis(2-hydroxy-6-methylphenylacetic acid)
EDDCHA (Ethylenediamine-N,N'-bis(5-carboxy-2-hydroxyphenylacetic acid)
EDDHSA (Ethylenediamine-N,N'-bis(2-hydroxy-5-sulfophenylacetic acid) and oxoacetic acid polymer with 1,2-ethanediamine and 4-hydroxybenzenesulfonic acid One may readily determine if such chelation agent loses color with increasing presence of hydrogen ions (acidic environment).

Two Out of Three Fertilizer System:

For example, the micronutrient solution may, rather than be caramel colored (as discussed above), be given a color, such as yellow. With two other fertilizer components, one may mix micronutrients with each individually to add (say) a yellow coloring to the existing coloring of the single component. Where the single component is blue, for instance, the addition of a yellow micronutrient solution may tint the final mixture green. Where the single component is red, for instance, the addition of a yellow micronutrient solution may tint the final mixture orange.

Two Out of Four Fertilizer System:

A dual component fertilizer system may include use of two fertilizer components selected from among four available, during the plant lifecycle. Where a micronutrient solution is colored yellow as in the example above, for instance, similar color determinations may be used. Thus, one may have a plant fertilizer system comprising a first fertilizer component that is colored blue, a second fertilizer component that is colored red, a third fertilizer component that is colored yellow, and a fourth micronutrient component that is colored (for example) purple. One may prepare this system in a dual-component mode such that a single fertilizer component is added to a micronutrient component. The final mixture may be green, orange, and various shades or hues thereof. In addition, where a purple fertilizer component is added to a yellow micronutrient component, the final mixture may be various shades of brown that may be so compared against a reference example.

Mobile Reference Application.

Figure 5:
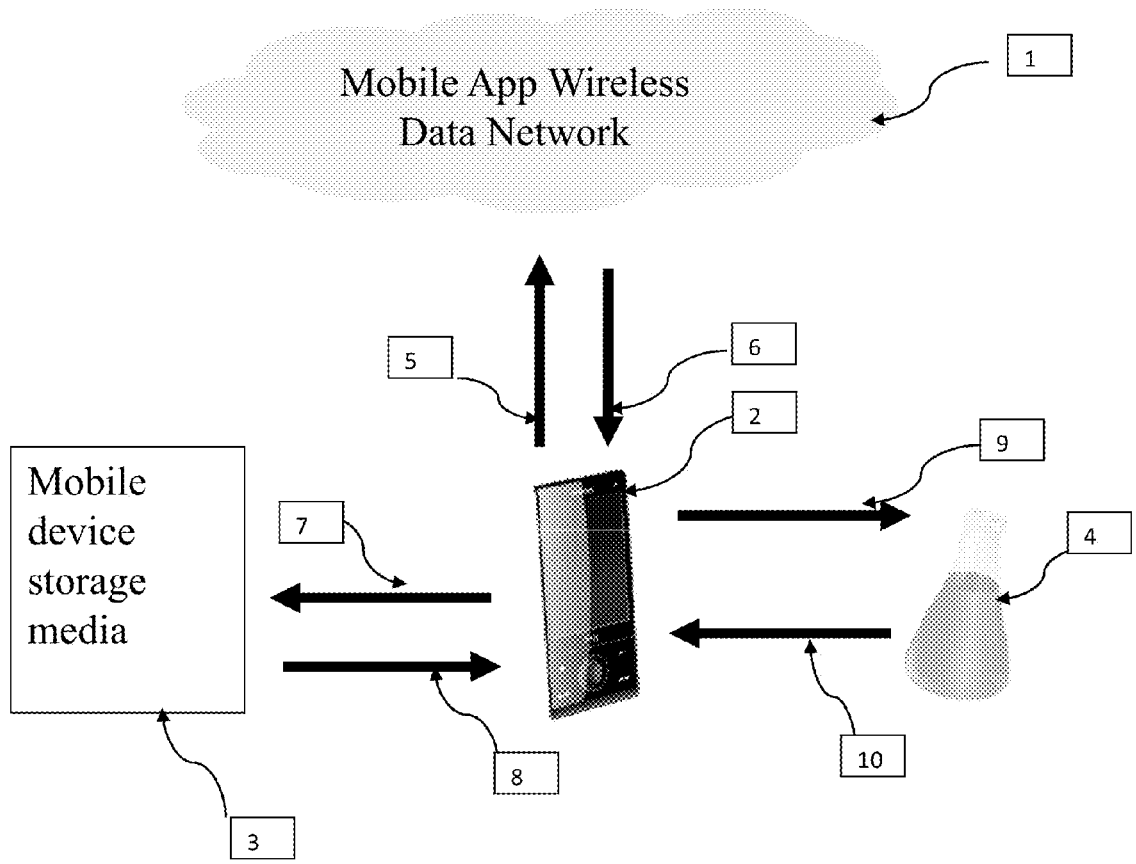
FIG. 5 is a graphic illustrating one example of information flow for a mobile embodiment of the present invention.

As illustrated by the graphic of FIG. 5, the present invention includes, in some embodiments, computer based methods for comparing a test sample color to a reference color, and these computer based methods may be suitable for mobile computing devices, such as phones and tablets, so long as they have a camera and means for storing the computer-based comparison application, or communicating to a remote location data such that the computer based application may be performed.

Generally, one may digitally compare a test color to a reference color using a mobile device. A general schematic is presented in FIGS. 3 and 4, as described above. A prophetic example is illustrated in FIG. 5, the numbering of which indicates as follows:
1) Represents a mobile application download source, such as a wireless data network;
2) Represents a camera phone or other device having a communication means and a camera (or other equivalent device for receiving color wavelengths reflected off an object, and digitizing the information so received);
3) Represents storage media on the device;
4) Represents a sample test mixture to be tested;
5) Represents wireless communication from the mobile device to the mobile application download source;
6) Represents wireless communication from the mobile application download source to the mobile device;
7) Represents storage of the mobile application on storage medium within the mobile device;
8) Represents retrieval of information from storage medium within the mobile device;
9) Represents obtaining optical information, such as taking a photo using a camera phone on the mobile device;
10) Represents storing optical information, a photo using a camera phone on the mobile device.

The remote application download source (1) may be available on a vendor server for download, such as via a mobile application. Or, one may access the application as it exists on a remote server, such as the vendor server (or other storage medium). A device (2) may have a camera, as typically the means for capturing the wavelengths of light reflected off of a sample mixture for testing. Other wavelength sensors may be available. The wavelength reflection information would be encoded in machine readable format. The device may also have communication means, such as the ability to transmit signal along suitable frequencies of the electromagnetic spectrum, particularly those licensed under appropriate regulatory authority. A mobile camera phone device, or tablet with a camera, is particularly contemplated. One may access the application (5) locally on the device (2) if one desires to download the application (6) onto storage medium (7) within the device (3). Or, one may access the application remotely, if the application is available on a remote server. The sample to be tested (4) should ideally be in a clear container, and it is particularly suitable to have a white background. It is particularly contemplated that the device is camera phone or a tablet computing device with a camera component, and one would take a photo (9) of the test sample (4) against the white background. One may further take a picture of a reference sample against a white background such that the ambient light is not a confounding factor (i.e., the light is the same for both test and reference). The wavelength information is then communicated to the app (either on the storage medium or on a remote server, for instance). If a reference example is stored within the app, as opposed to a reference example the app would retrieve the information pertaining to a reference sample (8). The application would then perform a calculation (as discussed above) comparing the information derived from the test mixture (4) reflected wavelengths and the reference mixture. The delta would then be presented to the user in the form of direction to modify the test mixture (4). The test mixture may be modified by, for instance, adding more fertilizer component, or by diluting with water.

Example IIIA

The below example sets forth the percent weight/weight of liter of water for a grow mix ("G"), and a bloom mix ("B"). Cobalt and molybdenum are expressed as parts per million. This example includes approximately 5% calcium, and may be useful where plants are irrigated with soft water. Also, this formula has relatively dense mineral composition, and may be particularly useful for fast growing annual plants.

The elements may be from a variety of sources. For commercial and practicability, one may consider costs and source availability for particular elemental moieties in the final product. One may dilute out the components as needed. One may, for instance, modify commercially available concentrates, such as those from assignee GenHydro®, in preparation of the final product. Table 4A is a formula expressed in terms of % weight or each element per liter of water (weight). One may add less or more water as desired while keeping the nutrient proportions, to prepare concentrates.

TABLE 4A

| Element | Grow: % w/w | Bloom: % w/w |
|---|---|---|
| Nitrate Nitrogen | 5.56% | 0.79% |
| Ammoniacal Nitrogen | 0.00% | 0.00% |
| Organic Nitrogen | 0.52% | 0.51% |
| Urea Nitrogen | 0.00% | 0.00% |
| Total N | 6.08% | 1.30% |
| K | 4.98% | 4.98% |
| S | 0.00% | 1.99% |
| P | 0.00% | 1.83% |
| Ca | 5.02% | 0.00% |
| Mg | 0.00% | 1.50% |
| Cl | 0.06% | 0.04% |
| Fe | 0.052% | 0.020% |
| Mn | 0.017% | 0.003% |
| Zn | 0.008% | 0.003% |
| B | 0.007% | 0.003% |
| Cu | 0.002% | 0.001% |
| Mo | 0.0017% | 16.53 |
| Co | | 6.43 |
| asP2O5 | 0.00% | 4.13% |
| asK2O | 6.03% | 6.02% |

How to use the formula of Example IIIA: One may blend the above example modifying the grow mix ("G") and the bloom mix ("B") as desired, as the plant grows and blooms. An example blend, expressed in milliliters per liter of water:

Table 4B

| | ml/l | ml/l | ml/l |
|---|---|---|---|
| Use: Grow | 2.5 | 1.3 | 2.6 |
| Use: Bloom | 1.4 | 2.6 | 2.6 |

Example IIIB

The below example sets forth the percent weight/weight of liter of water for a grow mix ("G"), and a bloom mix ("B") (although the terms "grow" and "bloom" are used for convenience as each may have different capacities depending on how used). Cobalt and molybdenum are expressed as parts per million. This example includes 4% calcium and may be useful where plants are irrigated with hard water.

The elements may be from a variety of sources. For commercial and practicability, one may consider costs and source availability for particular elemental moieties in the final product. One may dilute out the components as needed. One may, for instance, modify commercially available concentrates, such as those from assignee GenHydro®, in preparation of the final product. Table 5A is a formula expressed in terms of % weight or each element per liter of water (weight). One may add less or more water as desired while keeping the nutrient proportions, to prepare concentrates.

TABLE 5A

| Element | Grow: % w/w | Bloom: % w/w |
|---|---|---|
| Nitrate Nitrogen | 5.25% | 0.74% |
| Ammoniacal Nitrogen | 0.31% | 0.02% |
| Organic N | 0.52% | 0.51% |
| Urea Nitrogen | 0.00% | 0.12% |
| Total N | 6.09% | 1.38% |
| K | 4.90% | 4.96% |
| S | 0.00% | 1.83% |
| P | 0.00% | 1.92% |
| Ca | 4.00% | 0.00% |
| Mg | 0.21% | 1.36% |
| Cl | 0.06% | 0.06% |
| Fe | 0.051% | 0.024% |
| Mn | 0.017% | 0.003% |
| Zn | 0.008% | 0.003% |
| B | 0.007% | 0.003% |
| Cu | 0.003% | 0.001% |
| Mo | 0.0017% | 16.53 |
| Co | | 6.43 |
| asP2O5 | 0.00% | 4.35% |
| asK2O | 5.93% | 6.00% |

How to use the formula of Example IIIB: One may blend the above example modifying the grow mix ("G") and the bloom mix ("B") as desired, as the plant grows and blooms. An example blend, expressed in milliliters per liter of water:

TABLE 5B

| | ml/l | ml/l | ml/l |
|---|---|---|---|
| Use: Grow | 4.0 | 4.0 | 2.6 |
| Use: Bloom | 1.3 | 2.6 | 4.0 |

Example IIIC

Two-Out-of-Three Formulations ("Trio" Formulations)

This example provides three working examples of a three part system for selecting and mixing a plant fertilizer composition based on color, herein referred to as "Trio" formulations. By blending two of the three color components, one can make a final mixture that is suitable for optimum nutrient delivery during various stages of the plant life cycle. At some plant stages, one of the three components may be used; at others, three of the three. Trio 1, Trio 2 and Trio 3 are provided below.

The colors chosen for this illustrative example are blue, yellow, and red. By blending blue and yellow to create a green final formula, one would then test the green as against a reference hue to determine if the desired nutrient mix is created. Similarly, one may blend blue and red, or red and yellow components. One may choose to have starting components as green, orange and purple, or blue, purple and green, or any combination.

The blue component in the formulations of this example contain calcium but no phosphorus (phosphate), to substantially avoid precipitation of the calcium such that the calcium remains available for plant nutrient uptake. The yellow component in this example has high nitrogen and mild phosphate, magnesium, and sulfur. When the blue component is mixed with the yellow component, the resultant fertilizer blend is a shade of green. Because of the nutrients provided, this blend is contemplated to be optimal for plant early growth cycle, for seedling through early productive life. A red component is also provided, having low or no nitrogen, high phosphate, magnesium and sulfate. The red mixed with the blue makes shades of purple. Blending the red and blue components are contemplated to be particularly useful for providing optimum nutrients for plants in early production (flowers, vegetables and fruits) through harvest.

One could modify the formulations depending on conditions and nutrients so desired. One could, for example, add additional calcium, such as up to 5% additional calcium. The constituent moieties may be of any suitable source. For example, organic nitrogen may be from agar-agar, or from fish gelatin, and may be used in accordance with local governmental requirements.

One may, as described above, determine the desired final nutrient solution colorimetrically. This may be done using a computer based system, and, most practicably for those in the field, a hand held, wireless device, such as a mobile camera phone. A computer based application for comparing the color of the blend with a reference color, that is, a color indicating the optimal nutrient blend, may be used. One would capture an image of a test blend. The image of the test blend would then be stored in terms of a computer-readable language capturing the color of the test blend. This color would then be compared to a reference color using computer means. The reference color may be pre-stored, or may be taken under the same ambient light conditions as the test sample. Preferably, a white background is used, such as a sheet of paper. A computer-based calculation is used to provide the correct amount of additional color component to add to get the desired outcome.

Below are working examples of formulations designated Trio 1, Trio 2 and Trio 3.

Units are in weight per weight, as in one liter of water. One may add less or more water as desired while keeping the nutrient proportions, to prepare concentrates.

TABLE 6A

| | Trio 1 | | |
|---|---|---|---|
| | BLUE (A) Blue: Sum | RED Red: Sum | YELLOW (B) Yellow: Sum |
| Total in g/l | 1150 | 1180 | 1174 |
| Element | Blue: % w/w | Red: % w/w | Yellow: % w/w |
| NN | 4.94% | 0.00% | 2.02% |
| AN | 0.05% | 0.00% | 0.30% |
| organic N | 0.00% | 0.00% | 0.00% |
| Urea N | 0.00% | 0.51% | 1.37% |
| Total N | 4.99% | 0.51% | 3.69% |
| K | 2.66% | 3.37% | 5.15% |
| S | 0.00% | 2.20% | 0.66% |
| P | 0.00% | 2.21% | 0.97% |
| Ca | 5.02% | 0.00% | 0.00% |
| Mg | 0.00% | 1.51% | 0.99% |
| Cl | 0.04% | 0.04% | 0.00% |
| Fe | 0.043% | 0.004% | 0.000% |
| Mn | 0.017% | 0.001% | 0.000% |
| Zn | 0.008% | 0.001% | 0.000% |
| B | 0.007% | 0.001% | 0.000% |
| Cu | 0.002% | 0.000% | 0.000% |
| Mo | 0.0017% | 16.53 | 0.00% |
| asP2O5 | 0.00% | 5.00% | 2.18% |
| asK2O | 3.22% | 4.08% | 6.23% |

How to use Trio 1: One may blend the above example modifying the Blue component, and the Red component, and the Yellow component as desired, as the plant grows and blooms. An example blend (milliliters per liter of water of the above):

TABLE 6B

| Trio 1 usage | | | |
|---|---|---|---|
| | ml/l | ml/l | ml/l |
| Use Blue grow) | 2.6 | 1.3 | 2.6 |
| Use Red ripen) | 0.0 | 2.6 | 2.6 |
| Use Yellow | 2.6 | 0.0 | 0.0 |

TABLE 7A

| Trio 2 | | | |
|---|---|---|---|
| | BLUE (A) Blue: Sum | RED Red: Sum | YELLOW (B) Yellow: Sum |
| Total in g/l | 1150 | 1180 | 1174 |
| Element | Blue: % w/w | Red: % w/w | Yellow: % w/w |
| NN | 4.85% | 0.23% | 1.75% |
| AN | 0.05% | 0.00% | 0.26% |
| organic N | 0.00% | 0.00% | 0.00% |
| Urea N | 0.00% | 0.51% | 0.78% |
| Total N | 4.90% | 0.74% | 2.79% |
| K | 2.10% | 5.55% | 6.08% |
| S | 0.00% | 2.50% | 1.36% |
| P | 0.00% | 3.17% | 0.97% |
| Ca | 5.02% | 0.00% | 0.00% |
| Mg | 0.08% | 1.67% | 0.99% |
| Cl | 0.08% | 0.04% | 0.00% |
| Fe | 0.043% | 0.004% | 0.000% |
| Mn | 0.017% | 0.001% | 0.000% |
| Zn | 0.008% | 0.001% | 0.000% |
| B | 0.007% | 0.001% | 0.000% |
| Cu | 0.002% | 0.000% | 0.000% |
| Mo | 0.0017% | 16.53 | 0.00% |
| asP2O5 | 0.00% | 7.17% | 2.18% |
| asK2O | 2.55% | 6.71% | 7.36% |

How to use Trio 2: One may blend the above example modifying the Blue component, and the Red component, and the Yellow component as desired, as the plant grows and blooms. An example blend (milliliters per liter of water of the above):

TABLE 7B

| Trio 2 usage | | | |
|---|---|---|---|
| | ml/l | ml/l | ml/l |
| Use Blue (grow) | 2.6 | 2.6 | 1.3 |
| Use Red (ripen) | 0.0 | 2.6 | 2.6 |
| Use Yellow | 2.6 | 0.0 | 0.0 |
| | Green shade | Purple shade | Red/purple shade |

TABLE 8A

| Trio 3 | | | |
|---|---|---|---|
| | BLUE (A) Blue: Sum | RED Red: Sum | YELLOW (B) Yellow: Sum |
| Total in g/l | 1150 | 1180 | 1174 |
| Element | Blue: % w/w | Red: % w/w | Yellow: % w/w |
| NN | 4.03% | 0.00% | 2.16% |
| AN | 0.05% | 0.00% | 0.26% |
| organic N | 0.00% | 0.00% | 0.00% |
| Urea N | 0.00% | 0.00% | 0.78% |
| Total N | 4.08% | 0.00% | 3.20% |
| K | 0.09% | 3.68% | 8.71% |
| S | 0.00% | 2.12% | 1.68% |
| P | 0.00% | 2.31% | 1.35% |
| Ca | 4.40% | 0.00% | 0.00% |
| Mg | 0.33% | 1.38% | 0.99% |
| Cl | 0.08% | 0.04% | 0.00% |
| Fe | 0.043% | 0.004% | 0.000% |
| Mn | 0.017% | 0.001% | 0.000% |
| Zn | 0.008% | 0.001% | 0.000% |
| B | 0.007% | 0.001% | 0.000% |
| Cu | 0.002% | 0.000% | 0.000% |
| Mo | 0.0017% | 16.53 | 0.00% |
| asP2O5 | 0.00% | 5.22% | 3.06% |
| asK2O | 0.11% | 4.46% | 10.54% |

How to use Trio 3: One may blend the above example modifying the Blue component, and the Red component, and the Yellow component as desired, as the plant grows and blooms. An example blend (milliliters per liter of water of the above):

TABLE 8B

| Trio 3 usage | | | |
|---|---|---|---|
| | ml/l | ml/l | ml/l |
| Example plant | Sweet Pepper | Lettuce | Tomato |
| Use Blue (grow) | 3.1 | 3.6 | 2.1 |
| Use Red (ripen) | 0.0 | 0.0 | 0.0 |
| Use Yellow | 2.1 | 3.9 | 2.4 |

The above blends make shades of green, and optimize plant nutrient needs for the types of plants as indicated.

Trio 3 (Table 8A) may be used similarly to provide optimum nutrients to medicinal *cannabis* plants. The plant is grown with a mix favoring High Nitrogen (N), moderate P, K, Mg, and S. The plant is transitioned into its flowering phase using a middle-of-the-road blend with balanced N, P, K, Mg, S and Ca. The plant is finished for harvest with a low N, high P, Mg and S formulation. Micro nutrients vary as well with different blends to meet changing plant needs.

This series of mixes is designed to optimize medicinal *cannabis* plant growth and assure high purity for medicinal use. One may prepare a formulation further comprising a 1% (or about 1%) organic nitrogen in each of the three Trio A, B & C components to further improve this blend for pharmaceutical cultivation. Table 8C presents an example usage table for Trio 3 (Table 8A):

TABLE 8C

| Trio 3 usage | | | |
|---|---|---|---|
| | ml/l | ml/l | ml/l |
| Medicinal *Cannabis* Growth Phase | Seedling to mid-lifecycle | Midlife cycle to early flowering | Ripen to Harvest |
| Use Blue (A) | 2.5 | 3.6 | 1.5 |
| Use Yellow (B) | 3.0 | | |
| Use Red | | 4.0 | 5.0 |
| | Green shade | Purple shade | Red/Purple shade |

It is worth noting that the present invention also contemplates live plant material in a container with the present fertilizer compositions (disclosed passim), and plant products so produced by the process of fertilizing with the present compositions.

A formulation for *cannabis* containing organic nitrogen is presented in Table 8D:

TABLE 8D

Trio-formulation with organic nitrogen adapted for medicinal *cannabis*

| Element | Blue (A): % w/w | Red: % w/w | Yellow (B): % w/w |
|---|---|---|---|
| NN | 4.08% | 0.00% | 2.16% |
| AN | 0.00% | 0.00% | 0.26% |
| organic N* | 0.52% | 0.51% | 1.02% |
| UreaN | 0.00% | 0.00% | 0.00% |
| Total N | 4.60% | 0.51% | 3.43% |
| K | 1.70% | 3.68% | 8.71% |
| S | 0.00% | 2.12% | 1.68% |
| P | 0.00% | 2.31% | 1.35% |
| Ca | 4.40% | 0.00% | 0.00% |
| Mg | 0.00% | 1.38% | 0.99% |
| Cl | 0.08% | 0.04% | 0.00% |
| Fe | 0.043% | 0.004% | 0.000% |
| Mn | 0.017% | 0.001% | 0.000% |
| Zn | 0.008% | 0.001% | 0.000% |
| B | 0.007% | 0.001% | 0.000% |
| Cu | 0.002% | 0.000% | 0.000% |
| Mo | 0.0017% | 16.53 | 0.00% |
| asP2O5 | 0.00% | 5.22% | 3.06% |
| asK2O | 2.06% | 4.46% | 10.54% |

*Organic nitrogen may be obtained from a variety of sources, such as gelatin, feather meal, or soy meal.

The usage schedule according to Table 8C may also be used for the fertilizer components in Table 8D.

Example III D

Modified Dual Component Examples

One may prepare colorized plant fertilizer components using a two-component system, as indicated above. The below working example (denominated "Flora Duo Example 'FDLB829'") sets forth the percent weight/weight (per liter of water) of constituent moieties for a two part mix ("A"), and ("B"). Molybdenum is expressed as parts per million. The elements may be from a variety of sources. For commercial and practicability, one may consider costs and source availability for particular elemental moieties in the final product. One may dilute out the components as needed. One may, for instance, modify commercially available concentrates, such as those from assignee GenHydro®, in preparation of the final product. One may modify the formula by adding calcium up to 5% or about 5%.

TABLE 9A

Flora Duo Example "FDLB829"

| Element | A: % w/w | B: % w/w |
|---|---|---|
| NN | 5.25% | 0.74% |
| AN | 0.31% | 0.02% |
| organic N* | 0.52% | 0.51% |
| UreaN | 0.00% | 0.12% |
| Total N | 6.09% | 1.38% |
| K | 4.90% | 4.96% |
| S | 0.00% | 1.83% |
| P | 0.00% | 1.92% |
| Ca | 4.00% | 0.00% |
| Mg | 0.21% | 1.36% |
| Cl | 0.06% | 0.06% |
| Fe | 0.051% | 0.024% |
| Mn | 0.017% | 0.003% |
| Zn | 0.008% | 0.003% |

TABLE 9A-continued

Flora Duo Example "FDLB829"

| Element | A: % w/w | B: % w/w |
|---|---|---|
| B | 0.007% | 0.003% |
| Cu | 0.003% | 0.001% |
| Mo | 16.53 ppm | 16.53 ppm |
| asP2O5 | 0.00% | 4.35% |
| asK2O | 5.93% | 6.00% |

*Organic nitrogen may be obtained from a variety of sources, such as gelatin, feather meal, or soy meal.

How to use the formula of Example IIID ("FDLB829"): One may blend the above example modifying the mix consisting of "A" and "B" as desired, as the plant grows and blooms. An example blend (milliliters per liter of water of the above):

TABLE 9B

| | ml/l | ml/l | ml/l |
|---|---|---|---|
| Use: A | 2.6 | 4.0 | 1.3 |
| Use: B | 2.6 | 1.3 | 4.0 |

FloraDuo "FDLB829" 'A' and 'B' may be mixed for different crops as follows:

TABLE 9C

FloraDuo FDLB829 Combinations for different crops:

| FD blends | FD "A" ml/l of water | FD "B" ml/liter of water |
|---|---|---|
| strawberry | 1.7 | 1.7 |
| endive | 3.4 | 2.7 |
| eggplant | 2.2 | 1.4 |
| bean | 2.2 | 1.7 |
| cucumber | 2.2 | 1.7 |
| kohlrabi | 1.9 | 1.4 |
| vegetable propagate | 3.2 | 1.7 |
| sweet pepper | 2.5 | 1.4 |
| lettuce | 3.4 | 2.7 |
| tomato | 2 | 1.7 |
| alstroemeria | 1.3 | 1.4 |
| carnation | 1.3 | 1.1 |
| bouvardia | 1.3 | 2.1 |
| chrysanthemum | 2.5 | 1.4 |
| gerbera | 1.4 | 0.9 |
| potted plants | 1.9 | 2.1 |
| rose | 0.9 | 0.7 |

FloraDuo "FDLB829" may be colorized as described herein. For example, if 'A' is colorized blue and 'B' is colorized red, mixes in ranges of purple will result, if 'A' is blue and 'B' is yellow, mixes in ranges of green will result; if 'A' is yellow and 'B' is red, mixes in ranges of orange will result.

The working example (Tables 10A, 10B and 10C), named "Flora Duo G21511," is a two component system for color blending. This is an example where citric acid may be used to reduce the pH to approximately 3.5, to obtain color for the components.

TABLE 10A

Flora Duo G21511

| Element | A: Blue % w/w | B: Red % w/w |
|---|---|---|
| NN | 5.13% | 0.54% |
| AN | 0.17% | 0.02% |
| organic N* | 1.04% | 1.02% |

TABLE 10A-continued

| | Flora Duo G21511 | |
|---|---|---|
| Element | A: Blue % w/w | B: Red % w/w |
| UreaN | 0.00% | 0.00% |
| Total N | 6.34% | 1.57% |
| K | 5.03% | 5.04% |
| S | 0.00% | 2.01% |
| P | 0.00% | 1.92% |
| Ca | 4.00% | 0.00% |
| Mg | 0.20% | 1.30% |
| Cl | 0.10% | 0.10% |
| Fe | 0.050% | 0.024% |
| Mn | 0.018% | 0.005% |
| Zn | 0.008% | 0.003% |
| B | 0.007% | 0.003% |
| Cu | 0.001% | 0.001% |
| Mo | 16.53 ppm | 16.53 ppm |
| asP2O5 | 0.00% | 4.35% |
| asK2O | 6.08% | 6.09% |

*Gelatin, feather meal, Soy meal or other soluble sources of organic nitrogen may be used.

How to use example formula Flora Duo G21511: One may blend the above example modifying mix ("A") and ("B") as desired, as the plant grows and blooms. An example blend (milliliters per liter of water of the above):

TABLE 10B

| | Flora DuoG21511 | | |
|---|---|---|---|
| | ml/l | ml/l | ml/l |
| Use: A | 1.3 | 4.0 | 2.6 |
| Use: B | 4.0 | 1.3 | 2.1 |
| | Reddish purple | Bluish purple | Purple |

TABLE 10C

| | Particular usage of Flora Duo G21511 | | |
|---|---|---|---|
| | ml/l | ml/l | ml/l |
| Example plant | Sweet Pepper | Lettuce | Tomato |
| Use: A | 3.0 | 4.0 | 2.2 |
| Use: B | 1.2 | 2.7 | 1.9 |

Alterations and variations may be made by those having ordinary skill in the art without departing from the spirit and scope of the invention. Therefore, it must be understood that the illustrated embodiments have been set forth only for the purposes of example and as such should not be taken as limiting the invention as defined by the following claims.

What is claimed is:

1. A kit comprising a first container and a second container, wherein the first container is colorized with a colorizer, the second container is colorized with a different colorizer from the first container, and each of the first container and the second container are selected from the group consisting of:
   a first composition comprising, as a weight per weight of liter of water percentage: Nitrogen about 6.0%; Potassium about 4.0%; Calcium about 5.0%; Boron about 0.018%; Cobalt about 0.0005%; Copper about 0.007%; Iron about 0.066%; Manganese about 0.26%; Molybdenum about 0.0015%; and Zinc about 0.007%;
   a second composition comprising, as a weight per weight of liter of water percentage: Phosphorus about 5.0%; Potassium about 5.0%; Magnesium about 1.5%; Sulphur about 2.3%; Boron about 0.01%; Cobalt about 0.0005%; Copper about 0.003%; Iron about 0.014%; Manganese about 0.01%; Molybdenum about 0.0015%; and Zinc about 0.003%;
   a third composition comprising, as a weight per weight of liter of water percentage: Nitrogen about 5.39%; Potassium about 4.16%; Calcium about 2.50%; Chloride about 0.93%; Boron about 0.018%; Cobalt about 0.75%; Copper about 0.007%; Iron about 0.066%; Manganese about 0.26%; Molybdenum about 1.88%; Zinc about 0.007%; and asK2O about 5.03%;
   a fourth composition comprising, as a weight per weight of liter of water percentage: Nitrogen about 1.60%; Phosphorus about 2.53%; Potassium about 3.28%; Magnesium about 1.47%; Sulphur about 1.92%; Boron about 0.011%; Cobalt about 0.0077%; Copper about 0.003%; Iron about 0.014%; Manganese about 0.007%; Molybdenum about 0.0193%; Zinc about 0.003%; AsP2O5 about 5.82%; AsK2O about 3.96%; and AsSO4 about 5.77%;
   a fifth composition comprising, as a weight per weight of liter of water percentage: Nitrogen about 6.08%; Potassium about 4.98%; Calcium about 5.02%; Chlorine about 0.06%; Iron about 0.052%; Manganese about 0.017%; Zinc about 0.008%; Boron about 0.007%; Copper about 0.002%; Molybdenum about 0.0017%; and asK2O about 6.03%;
   a sixth composition comprising, as a weight per weight of liter of water percentage: Nitrogen about 1.30%; Potassium about 4.98%; Sulfur about 1.99%; Phosphorus about 1.83%; Magnesium about 1.50%; Chlorine about 0.04%; Iron about 0.020%; Manganese about 0.003%; Zinc about 0.003%; Boron about 0.003%; Copper about 0.001%; Molybdenum about 16.53%; Cobalt about 6.43%; asP2O5 about 4.13%; and asK2O about 6.02%;
   a seventh composition comprising, as a weight per weight of liter of water percentage: Nitrogen about 6.09%; Potassium about 4.90%; Calcium about 4.00%; Magnesium about 0.21%; Chlorine about 0.06%; Iron about 0.051%; Manganese about 0.017%; Zinc about 0.008%; Boron about 0.007%; Copper about 0.003%; Molybdenum about 0.0017%; and asK2O about 5.93%; and
   an eight composition comprising, as a weight per weight of liter of water percentage: Nitrogen about 1.38%; Potassium about 4.96%; Sulfur about 1.83%; P about 1.92%; Magnesium about 1.36%; Chlorine about 0.06%; Iron about 0.024%; Manganese about 0.003%; Zinc about 0.003%; Boron about 0.003%; Copper about 0.001%; Molybdenum about 16.53%; Cobalt about 6.43%; asP2O5 about 4.35%; and asK2O about 6.00%;
   wherein the compositions in the first container and the compositions in the second container are mutually exclusive.

2. A kit comprising a first container, a second container, and a third container, wherein the first container is colorized, the second container is colorized with a different colorizer from the first container, the third container is colorized with a different colorizer from the first container and the second container, and each of the first container, the second container, and the third container are selected from the group consisting of:
   a first composition comprising, as a weight per weight of liter of water percentage: Nitrogen about 6.0%; Potassium about 4.0%; Calcium about 5.0%; Boron about 0.018%; Cobalt about 0.0005%; Copper about 0.007%; Iron about 0.066%; Manganese about 0.26%; Molybdenum about 0.0015%; and Zinc about 0.007%;

a second composition comprising, as a weight per weight of liter of water percentage: Phosphorus about 5.0%; Potassium about 5.0%; Magnesium about 1.5%; Sulphur about 2.3%; Boron about 0.01%; Cobalt about 0.0005%; Copper about 0.003%; Iron about 0.014%; Manganese about 0.01%; Molybdenum about 0.0015%; and Zinc about 0.003%;

a third composition comprising, as a weight per weight of liter of water percentage: Nitrogen about 5.39%; Potassium about 4.16%; Calcium about 2.50%; Chloride about 0.93%; Boron about 0.018%; Cobalt about 0.75%; Copper about 0.007%; Iron about 0.066%; Manganese about 0.26%; Molybdenum about 1.88%; Zinc about 0.007%; and asK2O about 5.03%;

a fourth composition comprising, as a weight per weight of liter of water percentage: Nitrogen about 1.60%; Phosphorus about 2.53%; Potassium about 3.28%; Magnesium about 1.47%; Sulphur about 1.92%; Boron about 0.011%; Cobalt about 0.0077%; Copper about 0.003%; Iron about 0.014%; Manganese about 0.007%; Molybdenum about 0.0193%; Zinc about 0.003%; AsP2O5 about 5.82%; AsK2O about 3.96%; and AsSO4 about 5.77%;

a fifth composition comprising, as a weight per weight of liter of water percentage: Nitrogen about 6.08%; Potassium about 4.98%; Calcium about 5.02%; Chlorine about 0.06%; Iron about 0.052%; Manganese about 0.017%; Zinc about 0.008%; Boron about 0.007%; Copper about 0.002%; Molybdenum about 0.0017%; and asK2O about 6.03%;

a sixth composition comprising, as a weight per weight of liter of water percentage: Nitrogen about 1.30%; Potassium about 4.98%; Sulfur about 1.99%; Phosphorus about 1.83%; Magnesium about 1.50%; Chlorine about 0.04%; Iron about 0.020%; Manganese about 0.003%; Zinc about 0.003%; Boron about 0.003%; Copper about 0.001%; Molybdenum about 16.53%; Cobalt about 6.43%; asP2O5 about 4.13%; and asK2O about 6.02%;

a seventh composition comprising, as a weight per weight of liter of water percentage: Nitrogen about 6.09%; Potassium about 4.90%; Calcium about 4.00%; Magnesium about 0.21%; Chlorine about 0.06%; Iron about 0.051%; Manganese about 0.017%; Zinc about 0.008%; Boron about 0.007%; Copper about 0.003%; Molybdenum about 0.0017%; and asK2O about 5.93%; and an eight composition comprising, as a weight per weight of liter of water percentage: Nitrogen about 1.38%; Potassium about 4.96%; Sulfur about 1.83%; P about 1.92%; Magnesium about 1.36%; Chlorine about 0.06%; Iron about 0.024%; Manganese about 0.003%; Zinc about 0.003%; Boron about 0.003%; Copper about 0.001%; Molybdenum about 16.53%; Cobalt about 6.43%; asP2O5 about 4.35%; and asK2O about 6.00%;

wherein the compositions in the first container, the compositions in the second container, and the compositions in the third container are mutually exclusive.

3. A kit comprising a set of fertilizer compositions in a container wherein the set of fertilizer compositions are mutually disjointed, wherein each of the fertilizer compositions is marked by a marking agent, and wherein the kit is complete when one fertilizer composition is combined with another fertilizer composition to make a complete nutrient, the complete nutrient comprising all essential plant nutrients needed for a life cycle specific to a type of plant.

4. The kit of claim 3, wherein the marking agent is selected from at least one of: dyes, pigments, inks, paint, colored chemicals, chemiluminescent markers, or fluorescent markers.

5. The kit of claim 3, wherein the set of fertilizer compositions are colorized to provide an identifiable gradation when mixed with each other.

6. The kit of claim 5, wherein the identifiable gradation is at least one of color, fluorescence, or luminescence.

7. The kit of claim 6, wherein the color gradation is based on nutrient requirements for the life cycle specific to the type of plant.

8. The kit of claim 3, wherein each fertilizer compositions container is uniquely marked with a marking agent indicating that the fertilizer composition can be complementarily mixed with another fertilizer composition.

9. The kit of claim 3, wherein the kit comprises:
a first fertilizer composition container comprising a red dye marking agent, the composition comprising, as a weight per weight of liter of water percentage:
a) Phosphorus about 5.0%;
b) Potassium about 5.0%;
c) Magnesium about 1.5%;
d) Sulphur about 2.3%;
e) Boron about 0.01%;
f) Cobalt about 0.0005%;
g) Copper about 0.003%;
h) Iron about 0.014%;
i) Manganese about 0.01%;
j) Molybdenum about 0.0015%; and
k) Zinc about 0.003%;
a second fertilizer composition container comprising a yellow dye marking agent, the composition comprising, as a weight per weight of liter of water percentage:
a) Nitrogen about 1.38%;
b) Potassium about 4.96%;
c) Sulfur about 1.83%;
d) Phosphorus about 1.92%;
e) Magnesium about 1.36%;
f) Chlorine about 0.06%;
g) Iron about 0.024%;
h) Manganese about 0.003%;
i) Zinc about 0.003%;
j) Boron about 0.003%;
k) Copper about 0.001%;
l) Molybdenum about 16.53%;
m) Cobalt about 6.43%;
n) AsP2O5 about 4.35%; and
o) AsK2O about 6.00%; and
a third fertilizer composition container comprising a blue dye marking agent, the composition comprising, as a weight per weight of liter of water percentage:
a) Nitrogen about 6.0%;
b) Potassium about 4.0%;
c) Calcium about 5.0%;
d) Boron about 0.018%;
e) Cobalt about 0.0005%;
f) Copper about 0.007%;
g) Iron about 0.066%;
h) Manganese about 0.26%;
i) Molybdenum about 0.0015%; and
j) Zinc about 0.007%.

10. The kit of claim 9, wherein the kit comprises the first fertilizer composition and the second fertilizer composition.

11. The kit of claim 9, wherein the kit comprises the first fertilizer composition and the third fertilizer composition.

12. The kit of claim 9, wherein the kit comprises the second fertilizer composition and the third fertilizer composition.

13. The kit of claim 9, wherein the kit comprises the first fertilizer composition, the second fertilizer composition, and the third fertilizer composition.

14. The composition of claim 9, wherein any constituent varies by up to 20% increase or decrease in amount.

15. The composition of claim 14, wherein any constituent varies by up to 5% increase or decrease in amount.

16. The kit of claim 3, wherein the set of fertilizer compositions are in a liquid form.

17. A kit comprising a set of fertilizer compositions in a container wherein the set of fertilizer compositions are mutually disjointed, wherein each of the fertilizer compositions is marked by a marking agent, and wherein the kit is complete when one fertilizer composition is combined with another fertilizer composition to make a complete nutrient, the complete nutrient comprising all essential plant nutrients needed for a life cycle specific to a type of plant; and wherein the combining of the fertilizer compositions in a container is based on color of the marking agent.

18. A kit comprising a set of fertilizer compositions in a container wherein the set of fertilizer compositions are mutually disjointed, wherein each of the fertilizer compositions is marked by a marking agent, and wherein the kit is complete when one fertilizer composition is combined with another fertilizer composition to make a complete nutrient over a course of growth, bloom, and fruiting stages of plant life.

19. A kit comprising a set of fertilizer compositions in a container wherein the set of fertilizer compositions are mutually disjointed, wherein each of the fertilizer compositions is marked by a marking agent, and wherein the kit is complete when one fertilizer composition is combined with another fertilizer composition to make a complete nutrient; wherein one of the fertilizer compositions promotes plant growth and another one of the fertilizer compositions promotes plant bloom.

20. The kit of claim 19 wherein each fertilizer composition of the fertilizer compositions individually does not provide complete nutrients for plant fertilization.

* * * * *